(12) United States Patent
Glugla et al.

(10) Patent No.: US 9,752,495 B2
(45) Date of Patent: Sep. 5, 2017

(54) METHOD FOR PURGING CONDENSATE FROM A CHARGE AIR COOLER

(71) Applicant: Ford Global Technologies, LLC, Dearborn, MI (US)

(72) Inventors: Chris Paul Glugla, Macomb, MI (US); Kristofor Robert Norman, Canton, MI (US); Shuya Shark Yamada, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/287,266

(22) Filed: Oct. 6, 2016

(65) Prior Publication Data

US 2017/0051658 A1    Feb. 23, 2017

Related U.S. Application Data

(62) Division of application No. 13/904,875, filed on May 29, 2013, now Pat. No. 9,488,152.

(51) Int. Cl.

| | |
|---|---|
| *F02B 29/00* | (2006.01) |
| *F02B 29/04* | (2006.01) |
| *F02P 5/04* | (2006.01) |
| *F02D 41/02* | (2006.01) |
| *F02D 41/04* | (2006.01) |
| *F02D 41/30* | (2006.01) |
| *F02D 37/02* | (2006.01) |

(Continued)

(52) U.S. Cl.
CPC .......... *F02B 29/04* (2013.01); *F02B 29/0468* (2013.01); *F02B 37/00* (2013.01); *F02D 37/02* (2013.01); *F02D 41/0007* (2013.01); *F02D 41/008* (2013.01); *F02D 41/0295* (2013.01); *F02D 41/04* (2013.01); *F02D 41/26* (2013.01); *F02D 41/30* (2013.01); *F02D 41/3029* (2013.01); *F02P 5/04* (2013.01); *F02P 5/045* (2013.01); *F02B 29/0425* (2013.01); *F02B 29/0437* (2013.01); *F02D 13/0219* (2013.01); *F02D 13/0265* (2013.01); *F02D 41/0065* (2013.01); *F02D 41/3076* (2013.01); *F02D 41/402* (2013.01); *F02D 2041/001* (2013.01); *F02D 2200/0414* (2013.01); *F02M 26/05* (2016.02); *F02M 26/10* (2016.02); *Y02T 10/144* (2013.01); *Y02T 10/146* (2013.01)

(58) Field of Classification Search
CPC .. F02B 29/04; F02B 29/0406; F02B 29/0468; F02D 41/007; F02D 41/04; F02D 41/3076
See application file for complete search history.

(56) References Cited

U.S. PATENT DOCUMENTS

| | | |
|---|---|---|
| 4,348,211 A | 9/1982 | Zimmerman |
| 5,765,532 A | 6/1998 | Loye |

(Continued)

*Primary Examiner* — Thomas Moulis
(74) *Attorney, Agent, or Firm* — Julia Voutyras; McCoy Russell LLP

(57) ABSTRACT

Methods and systems are provided for cleaning out condensate stored at a charge air cooler. In response to increased condensate accumulation at a charge air cooler, airflow through the engine is increased to purge the condensate while an engine actuator is adjusted to maintain engine torque. Combustion stability issues of engine cylinders are addressed by adjusting fueling of each cylinder individually during condensate ingestion.

12 Claims, 9 Drawing Sheets

(51) Int. Cl.
    *F02B 37/00*     (2006.01)
    *F02D 41/26*     (2006.01)
    *F02D 41/00*     (2006.01)
    *F02D 41/40*     (2006.01)
    *F02D 13/02*     (2006.01)
    *F02M 26/05*     (2016.01)
    *F02M 26/10*     (2016.01)

(56) References Cited

U.S. PATENT DOCUMENTS

| | | |
|---|---|---|
| 8,156,923 B2 | 4/2012 | Lorenz et al. |
| 8,317,570 B2 | 11/2012 | Kundig |
| 9,127,607 B2 | 9/2015 | Glugla et al. |
| 9,133,757 B2 | 9/2015 | Glugla et al. |
| 9,145,823 B2 | 9/2015 | Glugla et al. |
| 9,151,214 B2 | 10/2015 | Glugla et al. |
| 9,188,056 B2 | 11/2015 | Glugla et al. |
| 9,249,718 B2 * | 2/2016 | Yoon |
| 9,250,006 B2 * | 2/2016 | Palm ............... F02B 29/0456 |
| 9,297,296 B2 * | 3/2016 | Kuske ............... F02B 37/00 |
| 9,334,791 B2 | 5/2016 | Glugla et al. |
| 9,359,964 B2 | 6/2016 | Glugla et al. |
| 2007/0119413 A1 | 5/2007 | Lewis et al. |
| 2010/0332075 A1 | 12/2010 | Clarke et al. |
| 2011/0083641 A1 * | 4/2011 | Gokhale ............... F02D 35/023 123/435 |
| 2011/0107760 A1 | 5/2011 | Quinn et al. |
| 2011/0137537 A1 | 6/2011 | Leone |
| 2012/0055143 A1 | 3/2012 | Asanuma et al. |
| 2013/0206115 A1 | 8/2013 | Kragh |
| 2014/0102424 A1 | 4/2014 | Norman |
| 2014/0352663 A1 | 12/2014 | Glugla et al. |

\* cited by examiner

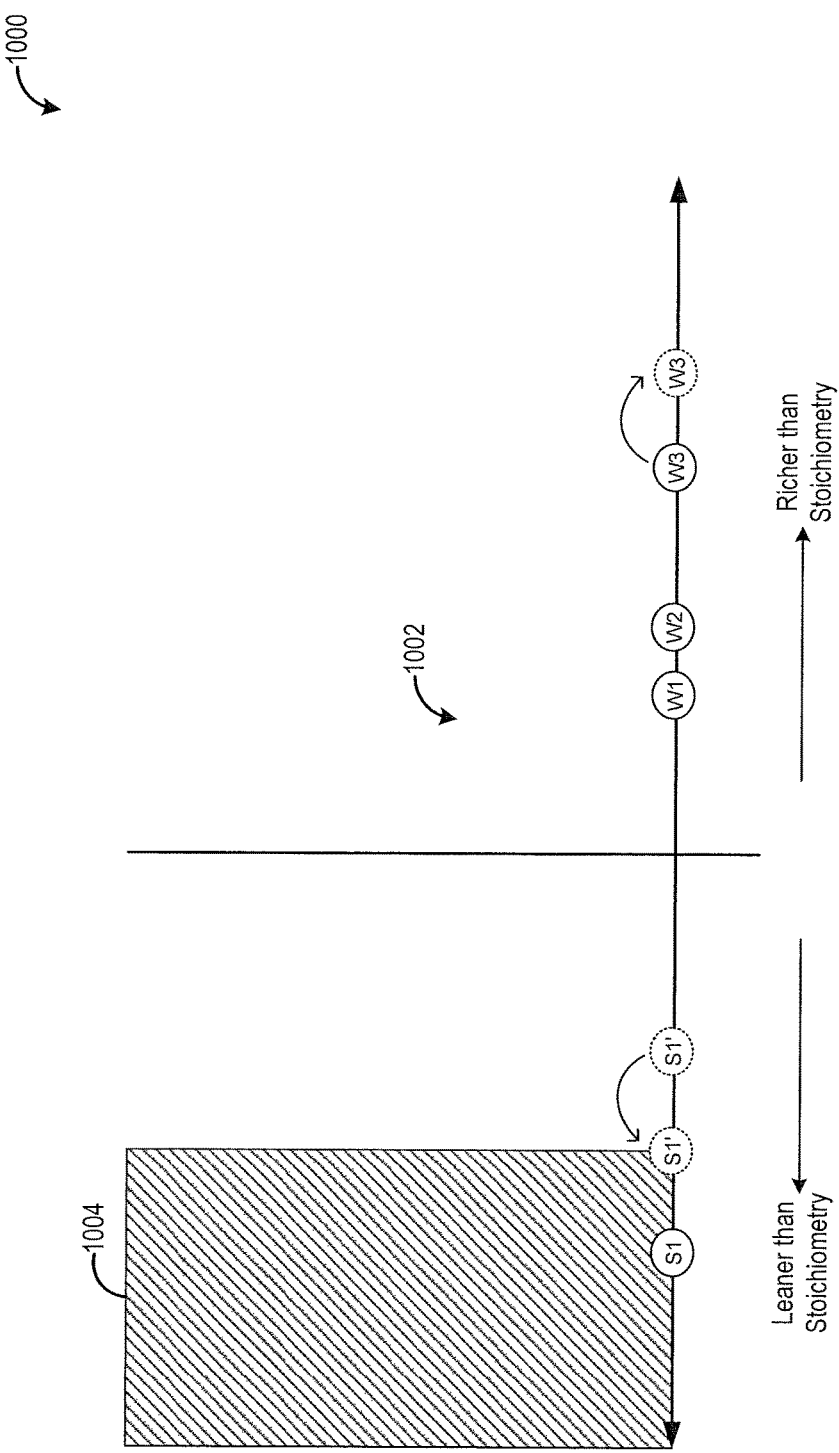

METHOD FOR PURGING CONDENSATE FROM A CHARGE AIR COOLER

CROSS REFERENCE TO RELATED APPLICATION

The present application is a divisional of U.S. patent application Ser. No. 13/904,875, entitled "METHOD FOR PURGING CONDENSATE FROM A CHARGE AIR COOLER," filed on May 29, 2013, the entire contents of which are incorporated herein by reference for all purposes.

FIELD

The present application relates to methods and systems for purging condensate from a charge air cooler without degrading combustion stability.

BACKGROUND/SUMMARY

Turbocharged and supercharged engines may be configured to compress ambient air entering the engine in order to increase power. Compression of the air may cause an increase in air temperature, thus, a charge air cooler may be utilized to cool the heated air thereby increasing its density and further increasing the potential power of the engine. Ambient air from outside the vehicle travels across the CAC to cool intake air passing through the inside of the CAC. Condensate may form in the CAC when the ambient air temperature decreases, or during humid or rainy weather conditions, where the intake air is cooled below the water dew point. Condensate may collect at the bottom of the CAC, or in the internal passages, and cooling turbulators. When torque is increased, such as during acceleration, increased mass air flow may strip the condensate from the CAC, drawing it into the engine and increasing the likelihood of engine misfire.

Example approaches of addressing combustion issues (e.g., misfire) resulting from condensate ingestion involve avoiding condensate build-up. However, the inventors herein have recognized potential issues with such methods. Specifically, while some methods may reduce or slow condensate formation in the CAC, condensate may still build up over time. If this build-up cannot be stopped, ingestion of the condensate during acceleration may cause engine misfire. In addition, based on the engine speed-load condition, as well as the configuration of the engine (e.g., based on whether the engine is V-engine with distinct banks or an in-line engine), some cylinders may receive more condensate than others, rendering them more prone to combustion issues than others. Other example approaches of addressing the combustion issues involve trapping and/or draining the condensate from the CAC. While this may reduce condensate levels in the CAC, condensate is moved to an alternate location or reservoir, which may be subject to other condensate problems such as freezing and corrosion. Further, the reservoir may add component cost and complexity. Still other approaches purge condensate from the CAC opportunistically when engine airflow increases, such as during a driver pedal tip-in. However, the tip-in may not occur at the same time that condensate purging is required. In the interim, condensate may continue to be ingested in the engine, degrading combustion.

In one example, the above described issues may be at least partly addressed by a method for purging condensate from the CAC during vehicle operating conditions. The method may comprise: in response to condensate level in a charge air cooler, adjusting fuel injection timing while increasing engine airflow to a level greater than requested by a vehicle operator. In this way, one or more engine cylinders may be temporarily operated in a lean stratified mode to purge the condensate while the operation of other engine cylinders is adjusted to maintain a stoichiometric exhaust air-fuel ratio.

In one example, an engine system may include a charge air cooler coupled downstream of a compressor and upstream of an intake throttle. During engine operation, condensate may collect at the charge air cooler. In response to condensate levels being higher than a threshold, purging conditions may be considered met and a clean-out cycle may be initiated to remove the condensate. In particular, the fuel injection timing of one or more engine cylinders may be shifted from an injection timing that provides a homogeneous cylinder air-fuel charge that is ignited with spark to an alternate injection timing that provides at least some stratified cylinder air-fuel charge that is ignited with spark. By operating at least some cylinders in a lean stratified mode, an engine airflow level can be increased to or above a blow-off level where condensate is blown into the engine.

As an example, cylinders that are less sensitive to water ingestion (that is, cylinders less prone to ingestion induced misfires) may be operated in the lean stratified mode while the remaining cylinders (that is, cylinders more prone to ingestion induced misfires) are operated rich such that an overall exhaust air-fuel ratio is maintained at or around stoichiometry. The degree of leanness may be adjusted based on the amount of condensate at the cylinder so that the engine airflow can be sufficiently increased. The water ingestion sensitivity of the cylinders may be determined based on engine speed-load conditions at the time of the purging, an amount of condensate received in each cylinder, a configuration of the engine, cylinder firing order, etc. Adjusting the fuel injection timing of a cylinder to transition from the homogenous mode of cylinder combustion to the lean stratified mode of cylinder combustion may include shifting fuel injection timing from an intake stroke to a compression stroke, increasing a number of injections per combustion event, adjusting a split ratio of fuel delivery split between the injections, etc.

In this way, condensate may be periodically cleaned from a charge air cooler by operating one or more cylinders in a lean stratified mode. By adjusting the fuel injection timing of a cylinder such that an airflow level is increased to a level that enables blowing off of condensate from the CAC, purging can be performed without waiting for a tip-in event. At the same time, by adjusting the fuel injection timing to providing a stratified fuel injection, a rich environment can be maintained in the vicinity of the cylinder's spark plug, allowing for a more stable combustion. By adjusting the fuel injection timing so that an overall exhaust air-fuel ratio is maintained at stoichiometry, engine performance during the purging is improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 10 shows a graphical example of adjusting air-fuel ratio of one or more engine cylinders during purging to operate at least some cylinders in a lean stratified mode.

DETAILED DESCRIPTION

Figure 1:
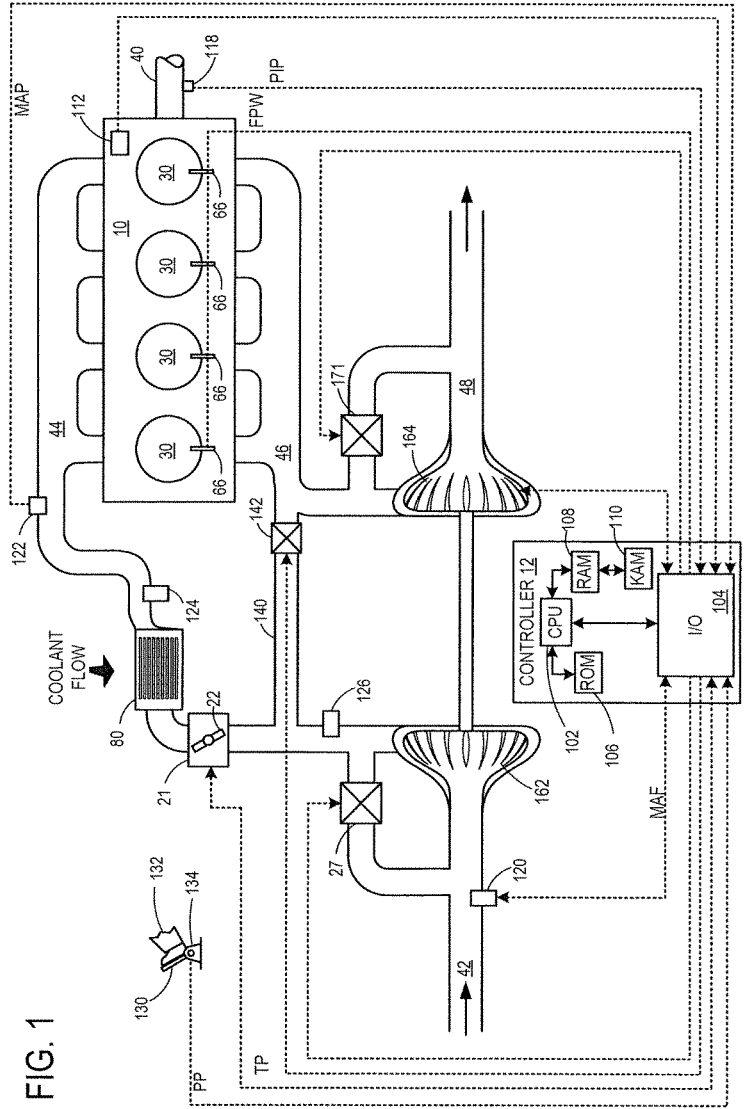
FIG. 1 is a schematic diagram of an example engine system including a charge air cooler.
Figure 2:
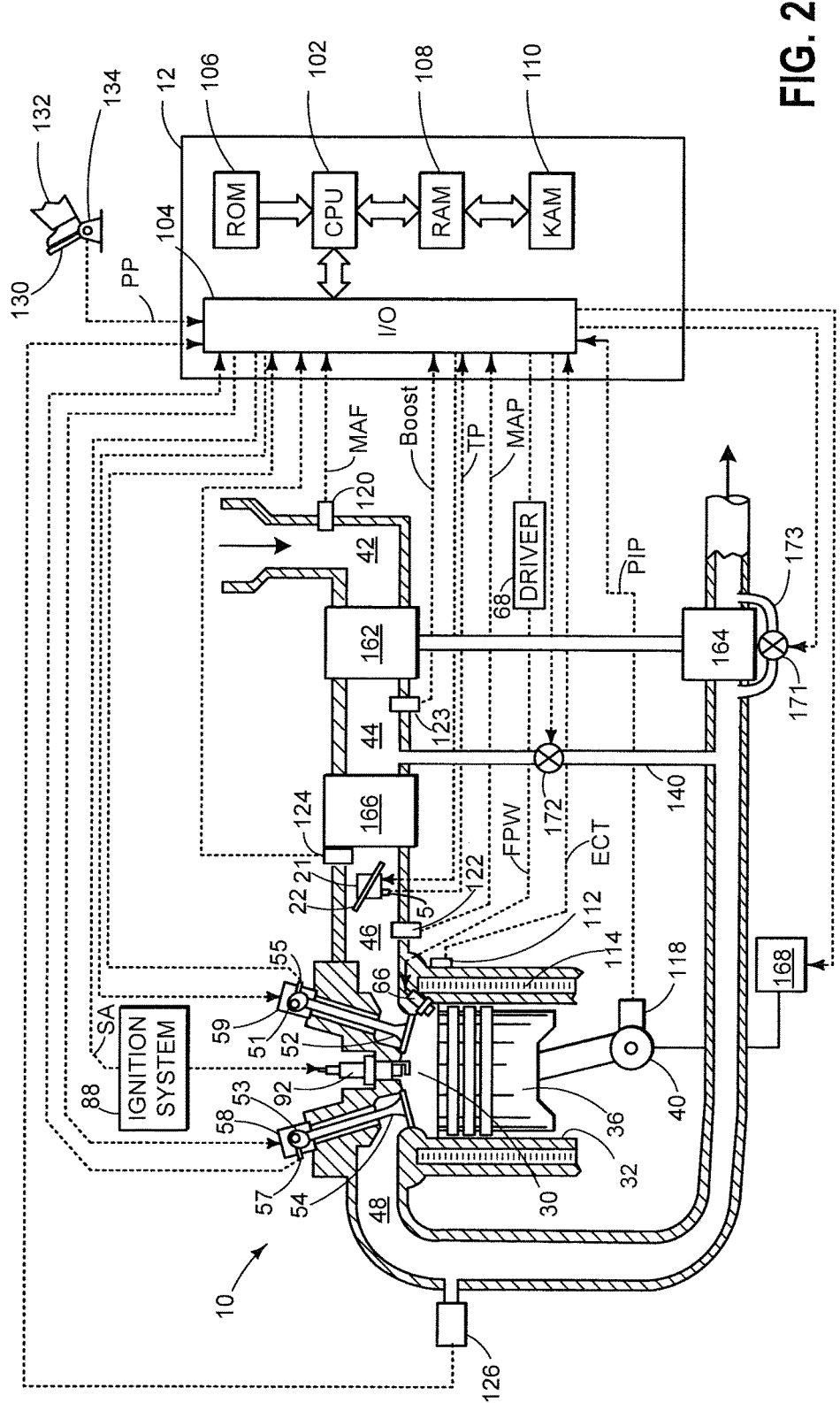
FIG. 2 shows an example combustion chamber of the engine system of FIG. 1.

The following description relates to systems and methods for purging condensate from a charge air cooler (CAC) to an engine system, such as the system of FIGS. 1-2. During the purging, engine airflow may be temporarily increased, while an engine actuator, such as spark timing, is adjusted responsive to the condensate flow. CAC condensate purging may occur in response to elevated condensate levels. An engine controller may be configured to perform a control routine, such as the routine of FIG. 3, to adjust fueling of each cylinder during the purging based on each cylinder's water ingestion sensitivity (FIG. 5). Alternatively, the controller may perform the example routine of FIG. 4 to adjust the fuel injection timing so that a lean stratified mode of cylinder combustion is provided. The controller may operate one or more cylinders rich while operating other cylinders lean (FIG. 6-8) with a degree of richness and leanness adjusted to maintain exhaust emissions. In either case, engine airflow is increased to blow off condensate into the engine cylinder, thereby reducing the occurrence of ingestion induced misfire events. Example fuel adjustments that may be used to strip condensate from a CAC and purge it into an engine intake are shown with reference to FIGS. 9-10.

FIG. 1 is a schematic diagram showing an example engine 10, which may be included in a propulsion system of an automobile. The engine 10 is shown with four cylinders 30. However, other numbers of cylinders may be used in accordance with the current disclosure. Engine 10 may be controlled at least partially by a control system including controller 12, and by input from a vehicle operator 132 via an input device 130. In this example, input device 130 includes an accelerator pedal and a pedal position sensor 134 for generating a proportional pedal position signal PP. Each combustion chamber (e.g., cylinder) 30 of engine 10 may include combustion chamber walls with a piston (discussed at FIG. 2) positioned therein. The pistons may be coupled to a crankshaft 40 so that reciprocating motion of the piston is translated into rotational motion of the crankshaft. Crankshaft 40 may be coupled to at least one drive wheel of a vehicle via an intermediate transmission system (not shown). Further, a starter motor may be coupled to crankshaft 40 via a flywheel to enable a starting operation of engine 10.

Combustion chambers 30 may receive intake air from intake manifold 44 via intake passage 42 and may exhaust combustion gases via exhaust manifold 46 to exhaust passage 48. Intake manifold 44 and exhaust manifold 46 can selectively communicate with combustion chamber 30 via respective intake valves and exhaust valves (not shown). In some embodiments, combustion chamber 30 may include two or more intake valves and/or two or more exhaust valves.

Fuel injectors 66 are shown coupled directly to combustion chamber 30 for injecting fuel directly therein in proportion to the pulse width of signal FPW received from controller 12. In this manner, fuel injector 66 provides what is known as direct injection of fuel into combustion chamber 30; however it will be appreciated that port injection is also possible. Fuel may be delivered to fuel injector 66 by a fuel system (not shown) including a fuel tank, a fuel pump, and a fuel rail.

Intake passage 42 may include throttle 21 having a throttle plate 22 to regulate air flow to the intake manifold. In this particular example, the position (TP) of throttle plate 22 may be varied by controller 12 to enable electronic throttle control (ETC). In this manner, throttle 21 may be operated to vary the intake air provided to combustion chamber 30 among other engine cylinders. In some embodiments, additional throttles may be present in intake passage 42, such as a throttle upstream of the compressor (not shown).

Further, in the disclosed embodiments, an exhaust gas recirculation (EGR) system may route a desired portion of exhaust gas from exhaust passage 48 to intake passage 42 via EGR passage 140. The amount of EGR provided to intake passage 42 may be varied by controller 12 via EGR valve 142. Under some conditions, the EGR system may be used to regulate the temperature of the air and fuel mixture within the combustion chamber. FIG. 1 shows a high pressure EGR system where EGR is routed from upstream of a turbine of a turbocharger to downstream of a compressor of a turbocharger. In other embodiments, the engine may additionally or alternatively include a low pressure EGR system where EGR is routed from downstream of a turbine of a turbocharger to upstream of a compressor of the turbocharger. When operable, the EGR system may induce the formation of condensate from the compressed air, particularly when the compressed air is cooled by the charge-air-cooler, as described in more detail below.

Engine 10 may further include a compression device such as a turbocharger or supercharger including at least a compressor 162 arranged along intake manifold 44. For a turbocharger, compressor 162 may be at least partially driven by a turbine 164, via, for example a shaft, or other coupling arrangement. The turbine 164 may be arranged along exhaust passage 48. Various arrangements may be provided to drive the compressor. For a supercharger, compressor 162 may be at least partially driven by the engine and/or an electric machine, and may not include a turbine. Thus, the amount of compression provided to one or more cylinders of the engine via a turbocharger or supercharger may be varied by controller 12.

Further, exhaust passage 48 may include wastegate 171 for diverting exhaust gas away from turbine 164. Additionally, intake passage 42 may include a compressor recirculation valve (CRV) 27 configured to divert intake air around compressor 162. Wastegate 171 and/or CRV 27 may be controlled by controller 12 to be opened when a lower boost pressure is desired, for example.

Intake passage 42 may further include charge air cooler (CAC) 80 (e.g., an intercooler) to decrease the temperature of the turbocharged or supercharged intake gases. In some embodiments, charge air cooler 80 may be an air to air heat exchanger. In other embodiments, charge air cooler 80 may be an air to liquid heat exchanger. CAC 80 may be a variable volume CAC wherein the charge air cooler 80 includes a valve to selectively modulate the amount and flow velocity of intake air traveling through the charge air cooler 80 in response to condensation formation within the charge air cooler as well as engine load conditions.

In both variable and non-variable embodiments of CAC 80, purging of stored condensate can be enabled in response to the condensate level being higher than a threshold. As elaborated herein, purging may be performed opportunistically during conditions when engine airflow is higher, such as during a tip-in event. Additionally, an engine airflow may be actively increased, for example, by increasing an opening of the throttle, to purge the condensate while an engine actuator, for example spark timing, is adjusted to maintain engine torque output. As further elaborated herein, purging may also be enabled by temporarily operating the engine in a stratified mode. Specifically, fuel injection timing to one or more engine cylinders may be adjusted such that at least some cylinders are operated in a lean stratified mode. The degree of leanness may be adjusted such that the engine airflow level (mass airflow rate) is at a level that causes condensate blow-off. By raising the mass airflow rate high enough, above the mass flow rate needed to start to purge the condensate from the CAC, but not high enough to cause misfire and poor combustion, the condensate can be removed without poor combustion side effects.

As such, the water ingestion sensitivity of the engine cylinders may vary with some cylinders having a higher water ingestion sensitivity (e.g., more prone to ingestion induced misfires) and other cylinders having a lower water ingestion sensitivity (e.g., less prone to ingestion induced misfires). The variation may be due to, for example, engine geometry, location of the cylinder on the engine bank, and firing order. In other words, the shape of the manifold may typically determine which cylinder(s) receive the condensate. For example, in an in-line engine, cylinders located furthest from the CAC may be more sensitive to water ingestion than cylinders located closest to the CAC. As another example, in a V-engine (e.g., a V-6 arrangement), cylinders located furthest from the throttle inlet may receive more condensate than cylinders positioned closer to the throttle inlet. For example, the left bank may experience more water ingestion if the throttle body is pointing to the left bank. As such, since water is denser than air, the condensate does not bend around turns and consequently can hit the end of the intake and run into the furthest cylinders. As yet another example, cylinders on one bank may be more sensitive than the cylinders on the other bank. Further still, the presence of additional bends in the intake can substantially flow a majority of the purged condensate into a specific cylinder.

In some embodiments, the water ingestion sensitivity may correlate with the amount (or percentage) of condensate the cylinders are likely to receive. This is because when the engine airflow is increased to purge the condensate, condensate amounts may unequally flow to the engine cylinders with some cylinders receiving higher amounts of condensate than other cylinders. Therein, cylinders receiving larger amounts of condensate may be more prone to misfires and other combustion issues (that is, have higher water ingestion sensitivity) while other cylinders receiving smaller amounts of condensate may be less prone to misfires and other combustion issues (that is, have lower water ingestion sensitivity).

The water ingestion sensitivity may also vary with engine speed-load conditions. For example, a particular cylinder (or set of cylinders) may be more sensitive to water ingestion at low engine speed-load conditions while an alternate cylinder (or set of cylinders) are more sensitive to water ingestion at low-mid engine speed-load conditions. In an alternate example, water ingestion sensitivities of all the cylinders may be lower at low engine speed-load conditions due to the intake air mass flow being too low at the low engine speed and/or low engine load conditions to carry water from the CAC to the intake manifold. In another example, at high engine speed and high engine load conditions, the water ingestion sensitivity of all the cylinders may be higher due to the higher air mass flow rates that strip the condensate from the CAC and carry it into the intake manifold. Further still, if the airflow is sufficient enough, at high engine speed and low engine load conditions, the cylinders may be most sensitive to water ingestion due to poor combustion stability of the cylinders at the light load conditions. Since the shape of the manifold largely determines which cylinders ingest the condensate, in another example, a particular cylinder (or set of cylinders) may be more sensitive to water ingestion at high engine speed-load conditions while an alternate cylinder (or set of cylinders) is more sensitive to water ingestion at low-mid engine speed-load conditions.

Differences in water ingestion sensitivity between the cylinders may be inferred or estimated based on operating conditions. Alternatively, the engine may be characterized during engine testing using a dynamometer. Specifically, during engine testing, water vapor may be introduced into the air intake system and cylinder pressure data may be utilized to characterize the effect of the water. The cylinders may then be mapped to identify the "weak" cylinders with high water ingestion sensitivity and the "strong" cylinders with low water ingestion sensitivity. The map may be stored in the controller's memory (for example, as a function of engine speed-load conditions), and retrieved during a purging operation. As elaborated herein, to compensate for the difference in water ingestion sensitivity, and/or the unequal condensate flow along the cylinders, during purging, the fueling of each cylinder may be adjusted based on the water ingestion sensitivity of each cylinder. For example, the "weak" cylinders (having higher water ingestion sensitivity) may be operated rich while the "strong" cylinders (having lower water ingestion sensitivity) are operated lean. A degree of leanness of the lean operating cylinders may be adjusted so that the engine airflow can be increased to or above a blow-off level that enables condensate to be purged from the CAC. A degree of richness of the rich operating cylinders is then adjusted based on the degree of leanness of the lean operating cylinders so that an overall exhaust air-fuel ratio (as seen by an exhaust catalyst) may be maintained at or around (e.g., oscillating around) stoichiometry. In one example, where the water ingestion sensitivity is induced by the unequal condensate ingestion, the controller may operate cylinders receiving more condensate rich while operating cylinders receiving less condensate lean, with an overall exhaust air-fuel ratio maintained at or around stoichiometry. By adjusting the fueling of each cylinder taking into account each cylinder's water ingestion sensitivity, condensate purging can be achieved without degrading cylinder combustion and without incurring frequent misfires.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10 for performing various functions to operate engine 10, in addition to those signals previously discussed, including measurement of inducted mass air flow (MAF) from mass air flow sensor 120; engine coolant temperature (ECT) from temperature sensor 112, shown schematically in one location within the engine 10; a profile ignition pickup signal (PIP) from Hall effect sensor 118 (or other type) coupled to crankshaft 40; the throttle position (TP) from a throttle position sensor, as discussed; and absolute manifold pressure signal, MAP, from sensor 122, as discussed. Engine speed signal, RPM, may be generated by controller 12 from signal PIP. Manifold pressure signal MAP from a manifold pressure sensor may be used to provide an indication of vacuum, or pressure, in the intake manifold 44. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft 40.

Other sensors that may send signals to controller 12 include a temperature sensor 124 at the outlet of the charge air cooler 80, and a boost pressure sensor 126. Still other sensors include knock sensor 90 coupled to the engine block. The controller may infer condensate consumption at one or more engine cylinders during condensate purging based on the knocking frequency of the cylinders. Other sensors not depicted may also be present, such as a sensor for determining the intake air velocity at the inlet of the charge air cooler, and other sensors, as described at FIG. 2. In some examples, storage medium read-only memory 106 may be programmed with computer readable data representing instructions executable by processor 102 for performing the methods described below as well as other variants that are anticipated but not specifically listed. Example routines are described herein at FIGS. 3-4.

Referring now to FIG. 2, a detailed embodiment of one cylinder of the engine of FIG. 1 is shown. As such, components previously introduced in FIG. 1 may be numbered the same in FIG. 2 and will not be re-introduced. Engine 10 includes combustion chamber (cylinder) 30 and cylinder walls 32 with piston 36 positioned therein and connected to crankshaft 40. Combustion chamber 30 is shown communicating with intake manifold 46 and exhaust manifold 48 via respective intake valve 52 and exhaust valve 54. Each intake and exhaust valve may be operated by an intake cam 51 and an exhaust cam 53. The opening and closing time of exhaust valve 54 may be adjusted relative to crankshaft position via cam phaser 58. The opening and closing time of intake valve 52 may be adjusted relative to crankshaft position via cam phaser 59. The position of intake cam 51 may be determined by intake cam sensor 55. The position of exhaust cam 53 may be determined by exhaust cam sensor 57. In this way, controller 12 may control the cam timing through phasers 58 and 59. Variable cam timing (VCT) may be either advanced or retarded, depending on various factors such as engine load and engine speed (RPM).

Fuel injector 66 is shown positioned to inject fuel directly into combustion chamber 30, which is known to those skilled in the art as direct injection. Alternatively, fuel may be injected to an intake port to provide port injection of the fuel. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In one example, a high pressure, dual stage, fuel system is used to generate higher fuel pressures. In addition, intake manifold 46 is shown communicating with optional electronic throttle 62 which adjusts a position of throttle plate 64 to control air flow from intake boost chamber 44. Compressor 162 draws air from air intake 42 to supply intake boost chamber 44. Exhaust gases spin turbine 164 which is coupled to compressor 162 which compresses air in boost chamber 44. Various arrangements may be provided to drive the compressor. For a supercharger, compressor 162 may be at least partially driven by the engine and/or an electric machine, and may not include a turbine. Thus, the amount of compression provided to one or more cylinders of the engine via a turbocharger or supercharger may be varied by controller 12. Turbocharger waste gate 171 is a valve that allows exhaust gases to bypass turbine 164 via bypass passage 173 when turbocharger waste gate 171 is in an open state. Substantially all exhaust gas passes through turbine 164 when waste gate 171 is in a fully closed position.

An exhaust gas recirculation (EGR) system may route a desired portion of exhaust gas from exhaust manifold 48 to intake boost chamber 44 via EGR passage 140. The amount of EGR provided to intake boost chamber 44 may be varied by controller 12 via EGR valve 172. Under some conditions, the EGR system may be used to regulate the temperature of the air and fuel mixture within the combustion chamber. The EGR system may induce the formation of condensate from the compressed air, particularly when the compressed air is cooled by the charge air cooler, as described in more detail below. Specifically, EGR contains a large amount of water as it is a combustion by-product. Since EGR is at a relatively high temperature and contains a lot of water, the dew-point temperature may also be relatively high. Consequently, condensate formation from EGR can be much higher than condensate formation from compressing air and lowering it to the dew-point temperature.

Intake boost chamber 44 may further include charge air cooler (CAC) 166 (e.g., an intercooler) to decrease the temperature of the turbocharged or supercharged intake gases. In some embodiments, CAC 166 may be an air to air heat exchanger. In other embodiments, CAC 166 may be an air to liquid heat exchanger. CAC 166 may include a valve to selectively modulate the flow velocity of intake air traveling through the charge air cooler 166 in response to condensation formation within the charge air cooler.

Hot charge air from the compressor 162 enters the inlet of the CAC 166, cools as it travels through the CAC 166, and then exits to pass though the throttle 62 and into the engine intake manifold 46. Ambient air flow from outside the vehicle may enter engine 10 through a vehicle front end and pass across the CAC, to aid in cooling the charge air. Condensate may form and accumulate in the CAC when the ambient air temperature decreases, or during humid or rainy weather conditions, where the charge air is cooled below the water dew point. When the charge air includes recirculated exhaust gasses, the condensate can become acidic and corrode the CAC housing. The corrosion can lead to leaks between the air charge, the atmosphere, and possibly the coolant in the case of water-to-air coolers. To reduce the accumulation of condensate and risk of corrosion, condensate may be collected at the bottom of the CAC, and then be purged into the engine during selected engine operating conditions, such as during acceleration events. However, if the condensate is introduced at once into the engine during an acceleration event, there may be an increase in the chance of engine misfire or combustion instability (in the form of late/slow burns) due to the ingestion of water. Thus, as elaborated herein with reference to FIGS. 3-4, condensate may be purged from the CAC to the engine under controlled conditions. This controlled purging may help to reduce the likelihood of engine misfire events. In one example, condensate may be purged from the CAC using increased airflow.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of turbine 164. Alternatively, a two-state exhaust gas oxygen sensor may be substituted for UEGO sensor 126.

In some examples, the engine may be coupled to an electric motor/battery system in a hybrid vehicle. The hybrid vehicle may have a parallel configuration, series configuration, or variation or combinations thereof. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 46, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. Spark ignition timing may be controlled such that the spark occurs before (advanced) or after (retarded) the manufacturer's specified time. For example, spark timing may be retarded from maximum break torque (MBT) timing to control engine knock or advanced under high humidity conditions. In particular, MBT may be advanced to account for the slow burn rate. During the expansion stroke, the expanding gases push piston 36 back to BDC. Crankshaft 40 converts piston movement into a rotational torque of the rotary shaft. Crankshaft 40 may be used to drive alternator 168. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Controller 12 receives various signals from sensors coupled to engine 10, including those signals previously discussed. Controller 12 may communicate with various actuators, which may include engine actuators such as fuel injectors, an electronically controlled intake air throttle plate, spark plugs, camshafts, etc. Various engine actuators may be controlled to provide or maintain torque demand as specified by the vehicle operator 132. These actuators may adjust certain engine control parameters including: variable cam timing (VCT), the air-to-fuel ratio (AFR), alternator loading, spark timing, throttle position, etc. For example, when an increase in PP is indicated (e.g., during a tip-in) from pedal position sensor 134, torque demand is increased.

Figure 3:
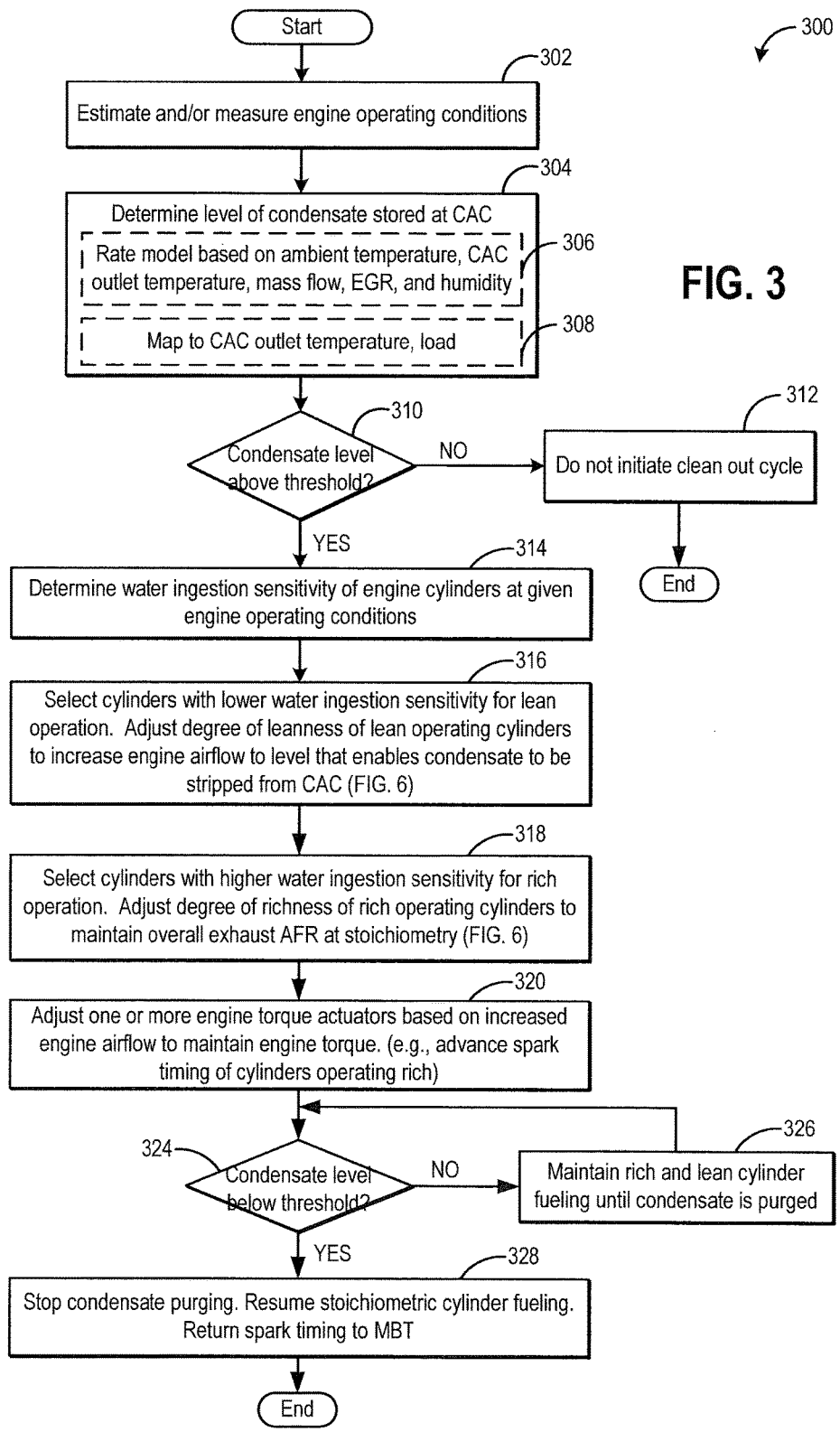
FIG. 3 shows a high level flow chart of a method for adjusting engine fueling during purging of condensate from a charge air cooler (CAC) based on each cylinder's water ingestion sensitivity.

Now turning to FIG. 3, an example routine 300 for purging condensate from a CAC while adjusting fueling of engine cylinders to compensate for unequal condensate flow and variations in water ingestion sensitivity is depicted. By increasing engine airflow while adjusting the fueling of the cylinders based on their condensate sensitivity, the condensate can be purged without increasing the frequency of misfires or other combustion issues.

At 302, the routine includes estimating and/or measuring engine operating conditions. These may include driver torque demand (based on a pedal position), engine speed (Ne) and load, ECT, boost, ambient temperature, MAF, MAP, EGR amount, air-fuel ratio (A/F), ambient humidity, ambient pressure, BP, engine temperature, exhaust catalyst temperature, CAC conditions (inlet and outlet temperature, inlet and outlet pressure, flow rate through the CAC, etc.) and other parameters.

At 304, the routine includes determining a level (or amount) of condensate stored at the CAC. This may include retrieving details such as ambient air temperature, ambient air humidity, inlet and outlet charge air temperature, and inlet and outlet charge air pressure from a plurality of sensors and using the variables to determine the amount of condensate formed in the CAC. The condensate level may be estimated based on each of mass air flow, ambient temperature, CAC outlet temperature, CAC pressure, ambient pressure, and an EGR amount. The condensate level may be further based on input from a humidity sensor. In one example, at 306, condensate levels at the CAC are based on a model that computes the rate of condensate formation within the CAC based on ambient temperature, CAC outlet temperature, mass flow, EGR, humidity, etc. Therein, the ambient temperature and humidity values are used to determine the dew point of the intake air, which may be further affected by the amount of EGR in the intake air (e.g., EGR may have a different humidity and temperature than the air from the atmosphere). The difference between the dew point and the CAC outlet temperature may indicate whether condensation will form within the cooler, and the mass air flow may affect how much condensation actually accumulates within the cooler.

In another example, at 308, condensate levels are mapped to CAC outlet temperature and a ratio of CAC pressure to ambient pressure. Alternatively, the condensation formation value may be mapped to CAC outlet temperature and engine load. Engine load may be a function of air mass, torque, accelerator pedal position, and throttle position, and thus may provide an indication of the air flow velocity through the CAC. For example, a moderate engine load combined with a relatively cool CAC outlet temperature may indicate a high condensation formation value, due to the cool surfaces of the CAC and relatively low intake air flow velocity. In one example, the map may include a modifier of ambient temperature. In another example, a pressure ratio of the CAC to the ambient pressure may be used to estimate condensation formation. Therein, engine load may be normalized and estimated in the intake manifold (behind the throttle) so it might be a lower pressure than in the CAC.

At 310, the determined condensate level may be compared to a threshold level to determine if purging conditions have been met. The threshold level may be an upper threshold of condensate storage. If the condensate level is not higher than the threshold level, then at 312, it may be determined that purging conditions have not been met and a clean out cycle is not initiated.

If the condensate level is higher than the threshold level, then at 314, the routine includes determining the water ingestion sensitivity of the engine cylinders at the given operating conditions. In one example, the water ingestion sensitivity of the engine cylinders may have been determined during engine testing (e.g., based on output from a dynamometer) and stored in the controller's memory in a look-up table (e.g., as a function of engine speed-load). The controller may then retrieve the data from the look-up table. An example look-up table is shown at 500 in FIG. 5. Therein, the engine is an inline 4 cylinder engine having a firing order of 1, 3, 4, 2. Based on the testing data, for a given engine speed-load condition, cylinders having higher water ingestion sensitivity may be marked as "weak" while cylinders having lower water ingestion sensitivity may be marked as "strong". For example, at low engine speed and low engine load conditions, all cylinders are considered strong since the mass airflow at these conditions is not high enough to strip condensate from the CAC. In comparison, at high engine speed and low engine load conditions, all the cylinders may be considered weak since the mass airflow at these conditions is high enough to strip condensate from the CAC but the low engine load leads to poor combustion stability. In another example, during conditions when the cylinders are sufficiently hot, none of the cylinders may be considered weak.

It will be appreciated that in alternate example, a given set of cylinders may be consistently prone to condensate ingestion across the engine speed-load range. This may be because, generally, condensate ingestion is a problem incurred mostly at high engine speed and/or high engine load conditions where the mass air flow is high enough to strip condensate out of the CAC. Additionally, at light loads, with low or high engine speeds, it may be unlikely that the air mass flow rate is high enough to strip the condensate. In still further engine embodiments, a device like a charge motion control valve, or plenum communication valve, may be included in the intake manifold which may change manifold dynamics enough to affect condensate distribution in the intake manifold.

At 316, the strong cylinders with the lower water ingestion sensitivity may be selected for lean engine operation. Further, a degree of leanness of the selected cylinders may be adjusted to increase the engine airflow to or above a threshold level (herein also referred to as a blow-off level) that enables condensate purging. As such, the engine airflow may be increased by increasing an opening of an intake throttle based on the degree of leanness requested. The degree of leanness may be selected to provide an increased engine airflow level that is based on the estimated condensate level at the charge air cooler and engine operating conditions. For example, as the condensate level increases, a degree of leanness may be scheduled to increase engine airflow to or above a threshold level that is required to strip water from the CAC at a controlled rate. That is, by operating one or more of the engine cylinders lean (herein, by operating the strong cylinders lean), engine airflow level is increased based on the condensate level in the charge air cooler, as well as the rate at which the condensate should be introduced to the engine (which in turn is based on the rate it can ingest the condensate while minimizing impact on combustion), to or above a blow-off level required to purge condensate from the charge air cooler. By raising the airflow rate, a condensate airflow stripping velocity in the CAC is raised, which purges the condensate into the engine.

At 318, the routine includes selecting the weak cylinders with the higher water ingestion sensitivity for rich engine operation. Specifically, the degree of richness of the rich operating cylinders may be adjusted based on the degree of leanness of the lean operating cylinders so as to maintain an overall exhaust air-fuel ratio oscillating around stoichiometry.

As such, during the purging, unequal amounts of condensate may flow from the charge air cooler to among the cylinders. The variation may be largely a function of the geometry of the intake manifold as well as the physics of the way the condensate flows through the manifold. The amount of condensate flowed into each engine cylinder may vary based on one or more of engine speed, engine geometry (e.g., inline engine versus V-engine, 4-cylinder engine versus 6-cylinder engine, etc.), cylinder position on engine block (e.g., close to CAC or further from CAC), and cylinder firing order. For example, cylinders positioned farther from the CAC outlet and throttle inlet may receive more condensate during the purging than cylinders positioned closer to the CAC outlet or throttle inlet. In particular, due to the momentum of the flowing of the water towards the rear of the intake manifold, the condensate may impinge on the rear of the manifold, and be directed into the rear cylinders. As another example, cylinders may receive more condensate at higher engine speed-load conditions and less at lower engine speed-load conditions. In addition to the manifold and combustion system design, this unequal distribution of purged condensate among the engine cylinders may be at least partly responsible for the differences in cylinder water ingestion sensitivity. The water ingestion sensitivity may also be due to other engine operating conditions. For example, if a particular cylinder receives more residuals, and that cylinder also receives above average amounts of condensate, it may misfire first.

A degree of enrichment of the cylinders fueled rich and a degree of enleanment of the cylinders fueled lean may be adjusted based on a number of cylinders with the higher water ingestion sensitivity and a number of cylinders with the lower water ingestion sensitivity, and further based on the amount of condensate being purged, to maintain the exhaust air-fuel ratio (as received at an exhaust emission control device, such as an exhaust three-way catalyst).

As elaborated below at FIG. 6, the adjusting may include first determining the degree of leanness of the strong cylinders to provide an engine airflow level that enables condensate blow-off and then adjusting the degree of richness of the weak cylinders to provide an overall stoichiometric exhaust air-fuel ratio. In other words, the degree of leanness of the weak cylinders may be the limiting factor. In alternate examples, however, the adjusting may include first determining the degree of richness required to address the combustion stability issues (e.g., propensity for misfires) of the weak cylinders and then adjusting the degree of leanness of the strong cylinders to provide an overall stoichiometric exhaust air-fuel ratio. In other words, the degree of richness of the weak cylinders may be the limiting factor.

In one example, cylinders receiving more than a threshold amount of condensate are operated rich with a degree of richness and amount of spark advance based on the number of cylinders receiving more condensate than the threshold amount and a number of cylinders receiving less condensate than the threshold amount, while cylinders receiving less than the threshold amount of condensate are operated lean with a degree of leanness based on the number of cylinders receiving more condensate than the threshold amount and the number of cylinders receiving less condensate than the threshold amount. As such, the sum of lean and rich operation on a given bank of cylinders may be adjusted and maintained at or near stoichiometry to maintain emissions. The degree of richness of the rich operating cylinders as well as the degree of leanness of the lean operating cylinders may be further based on a difference between the amount of condensate received and the threshold amount. An example fueling adjustment is shown with reference to FIG. 9.

At 320, the routine includes adjusting an engine actuator based on the increased engine airflow (as well as the reduced torque output of the lean cylinders and the slightly elevated torque output of the rich cylinders) to maintain engine torque (as such, rich for best torque (RBT) only elevates torque 1-2%). This allows engine airflow to be increased without increasing engine torque. The adjusted engine torque actuator may include one or more of ignition spark timing, variable camshaft timing, and alternator load. In one example, while increasing the engine airflow, spark timing may be advanced (e.g., advanced from nominal MBT) in the rich operating cylinders, since they are likely to have slower combustion due the water ingestion. As such, the slowing of the combustion means MBT is advanced from a nominal location at standard testing conditions. At the same time, spark timing in the lean operating cylinders may be maintained (e.g., maintained at MBT). The richer air-fuel ratio also helps suppress knock in the rich operated cylinders as the rate of ingestion condensation decreases as the accumulated condensate is consumed. Herein, the spark advance is used to trim the torque slightly, as needed. In an alternate example, spark timing may be advanced in all the engine cylinders during the condensate purging with more spark advance applied to the cylinders operating rich (the weak cylinders) and less spark advance applied to the cylinders operating lean (the strong cylinders).

It will be appreciated that in an alternate example, the condensate purging may be performed opportunistically during a tip-in, and the increasing engine airflow may be due to the driver tip-in. In such an embodiment, engine torque actuator adjustments may not be concurrently required and engine torque output may be allowed to increase to meet the increased driver torque demand. However, even during the opportunistic purging, where engine airflow is increased to or above the threshold blow-off level responsive to a tip-in, the controller may adjust the fueling of each cylinder during the opportunistic purging based on the water ingestion sensitivity of each individual cylinder. Specifically, while engine airflow is increased responsive to the operator pedal tip-in, cylinders with the higher water ingestion sensitivity may be enriched while the cylinders with the lower water ingestion sensitivity are enleaned with an overall exhaust air-fuel ratio maintained at or around stoichiometry.

In this way, to compensate for the unequal condensate flow, and/or the differences in water ingestion sensitivity among the cylinders, during the condensate flow, the controller can fuel some cylinders lean while fueling other cylinders rich while maintaining an exhaust air-to-fuel ratio of the engine oscillating around stoichiometry. In particular, each cylinder of the engine may be fueled based on a water ingestion sensitivity of each cylinder. Thus, cylinders with a higher water ingestion sensitivity may be enriched while cylinders with a lower water ingestion sensitivity are enleaned. Additionally, the rich cylinders may be run with additional spark advance to compensate for the slowed combustion rate. The enrichment also helps in decreasing knocking tendency, when condensate consumption decays as the engine consumes the condensate. A knock sensor output may confirm that the ingestion is ending, indicating to the controller that normal operating conditions can be restored. In one example, where the water ingestion sensitivity correlates with the unequal condensate distribution among the cylinders, each cylinder may be fueled based on an amount of condensate received in the cylinder with cylinders receiving more than a threshold amount of condensate being enriched and spark advanced more, and cylinders receiving less than a threshold amount of condensate being enleaned and spark advanced less. That is, to increase engine airflow without increasing engine torque, spark ignition timing may be advanced for cylinders fueled rich and for cylinders fueled lean, with more spark advance used for the cylinders fueled rich than the cylinders fueled lean. For example, when operating the lean cylinder just lean of stoichiometry, such as at 15:1 AFR, at least some spark advance may be required as the burn rate may slow.

At 324, the condensate level at the CAC may be reassessed and it may be determined if sufficient purging has occurred. In particular, it may be determined if the condensate level is below a threshold level, specifically, a lower threshold level. The lower threshold level may reflect a lower threshold of condensate storage at the CAC. Further, the lower threshold level may include some margin for hysteresis.

In an alternate example, instead of determining if the condensate level has dropped sufficiently, it may be determined if condensate ingestion at the cylinders has dropped (due to the condensate being consumed and no further condensate being ingested). For example, a knock signal output by a knock sensor may be analyzed. As discussed above, rich operation of the weak cylinders helps in decreasing knocking tendency, when condensate consumption decays as the engine consumes the condensate. Based on the knock signal for combustion events in the rich operating (and spark advanced) cylinders, a controller may determine when all the condensate has been consumed. For example, in response to an increase in the knock signal and knock frequency associated with the rich cylinders, it may be determined that condensate ingestion in the cylinder has been completed. Accordingly, rich operation of the cylinders may be discontinued, as discussed below.

If the condensate level is still above the threshold level (or knocking frequency of the rich cylinders is below a threshold), at 326, the routine includes maintaining the fueling of each cylinder based on the water ingestion sensitivity of the cylinder while increasing engine airflow to purge condensate to the engine intake. In one example, the operating of some cylinders rich and some cylinders lean while increasing the engine airflow and without increasing the engine torque may be continued for a few seconds to complete the purging.

If the condensate level is determined to be below the (lower) threshold level (or the knocking frequency of the rich cylinders is above the threshold), then at 328, the routine includes stopping the purging of condensate from the CAC to the engine intake. This includes reducing the engine airflow back to a level based on the operator torque request and terminating the fueling of the cylinders based on their water ingestion sensitivity (or condensate ingestion amounts). In particular, stoichiometric fueling of the engine cylinders may be resumed. Alternatively, an alternate nominal fueling of the cylinders to provide a nominal cylinder combustion air-fuel ratio based on the engine operating conditions may be resumed. In addition, nominal spark timing may be resumed. For example, spark timing may be returned to MBT.

Figure 6:
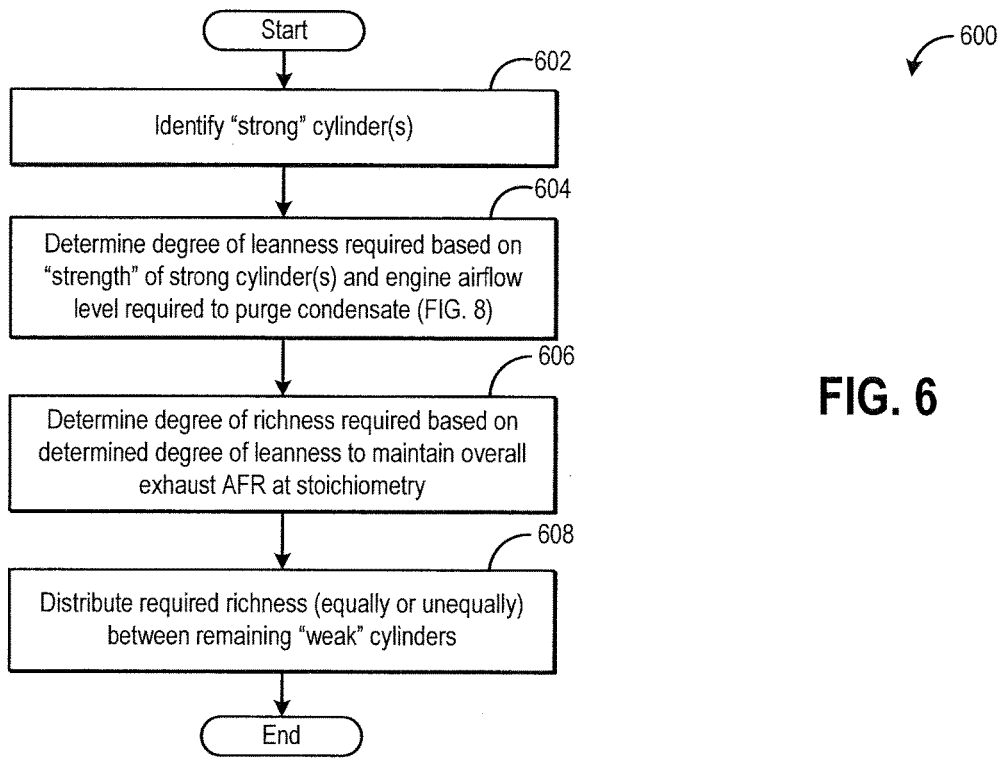
FIG. 6 shows a high level flow chart of a method for determining a degree of richness for the "weak" cylinders based on combustion stability limits and adjusting the degree of leanness of the "strong" cylinders in accordance.

Turning to FIG. 6, routine 600 depicts a method for determining the degree of richness of the weak cylinders and adjusting the degree of leanness of the strong cylinders in accordance. As such, the routine of FIG. 6 may be performed as part of the routine of FIG. 3, specifically at 316-318.

At 602, the strong cylinders having lower water ingestion sensitivity may be identified. For example, the strong cylinder data may be retrieved from the look-up table disclosed in FIG. 5. At 604, a degree of leanness required to increase engine airflow to a blow-off level, with degrading the combustion stability of the strong cylinders may be determined. For example, based on the "strength" of the cylinders, the number of strong cylinders, and further based on the amount of air and/or condensate expected to flow into the cylinder, a degree of leanness of a lean fuel injection may be determined. In one example, the controller may use a map, such as map 800 of FIG. 8 to determine the degree of leanness required for the cylinder based on its "strength", the degree of leanness required increasing as the "strength" of the strong cylinders increases. At 606, based on the determined degree of leanness, a degree of richness required to provide an overall exhaust air-fuel ratio at or around stoichiometry is calculated. Then, at 608, the required richness is distributed between the remaining "weak" cylinders having higher water ingestion sensitivity. The required richness may be distributed equally, with each of the strong cylinders receiving fuel with the same degree of richness. Alternatively, the required richness may be distributed unequally with each of the strong cylinders receiving a fuel injection having a richness based on each cylinder's strength. The controller may used a map, such as map 800 of FIG. 8 to determine the degree of richness required for each strong cylinder based on its respective "weakness", the degree of richness increased as the "weakness" of the weak cylinders increases, and further based on the desired richness to maintain stoichiometric exhaust.

For example, the engine may be an in-line 4 cylinder engine having one weak cylinder and 3 strong cylinders at the time of purging. Based on the weakness of the weak cylinder, a richness of 0.95 lambda may be used for the weak cylinder while the remaining strong cylinders are operated at 1.017 lambse so that the bank is operated at essentially 1.0 lambse. Alternatively, the leanness may be distributed unequally with a first strong cylinder operating at 1.015, a second strong cylinder operating at 1.0125, and a third cylinder operating at 1.0135. As another example, based on the weakness of the weak cylinder, a richness of 10:1 AFR may be determined. Accordingly, to provide an overall stoichiometric exhaust (that is, 14:1 AFR), the remaining strong cylinders may either receive an equal leanness of 16:1 AFR. Alternatively, the leanness may be distributed unequally with a first strong cylinder operating at 16:1 AFR, a second strong cylinder operating at 15:1 AFR, and a third cylinder operating at 15.5 AFR.

In this way, the routine of FIG. 3 (and FIG. 6) enables condensate purging with reduced combustion issues. By operating the cylinders with higher water ingestion sensitivity rich and with additional spark advance, combustion stability of cylinders most prone to misfire when ingesting condensate is reduced. By concurrently operating the cylinders with lower water ingestion sensitivity lean, engine airflow can be raised to enable stripping of condensate from the CAC while an overall exhaust air-fuel ratio is maintained around stoichiometry. This provides emissions benefits since the stoichiometric environment maintains the exhaust catalyst active and able to convert exhaust emissions.

It will be appreciated that in an alternate embodiment of FIG. 6, the degree of richness of the weak cylinders having higher water ingestion sensitivity may be identified first (FIG. 5) based on the "weakness" of the cylinders (FIG. 8), the number of weak cylinders, and further based on combustion stability of the cylinders. A degree of leanness of the lean operating cylinders may then be adjusted based on the determined degree of richness to provide an overall exhaust air-fuel ratio at or around stoichiometry.

In one example, in response to elevated condensate levels, one or more engine cylinders are operated lean so that an engine airflow is increased, without increasing engine torque, to purge condensate from a charge air cooler to engine cylinders. Engine cylinders may be selected for lean operation based on their water ingestion sensitivity. Herein, the cylinders may be receiving unequal condensate amounts. A combustion air-to-fuel ratio of each engine cylinder is adjusted during the purging based on the amount of condensate received and a water ingestion sensitivity of each cylinder. The cylinders receiving unequal condensate amounts may include the cylinders receiving condensate amounts based on engine speed-load conditions, engine geometry, cylinder position, and cylinder firing order. Increasing engine airflow without increasing engine torque may include increasing opening of an intake throttle while advancing spark timing for at least the rich operating cylinders. Adjusting the cylinder combustion air-fuel ratio on a cylinder-by-cylinder basis during the purging may include operating a first engine cylinder having a water ingestion sensitivity that is higher than a threshold at a combustion air-to-fuel ratio that is richer than stoichiometry, and operating a second engine cylinder having a water ingestion sensitivity that is lower than the threshold at a combustion air-to-fuel ratio that is leaner than stoichiometry. The degree of richness of the first engine cylinder may be adjusted based on the degree of leanness of the second engine cylinder so as to maintain an overall exhaust air-to-fuel ratio at or around stoichiometry.

In another example, in response to elevated condensate levels during an operator tip-in, engine airflow is increased to meet torque demand and condensate is opportunistically purged from the charge air cooler to engine cylinders. Due to the cylinders receiving unequal condensate amounts, a combustion air-to-fuel ratio of each engine cylinder is adjusted on a cylinder-by-cylinder basis during the purging based on the amount of condensate received and a water ingestion sensitivity of each cylinder.

In another example, an engine system comprises an engine including one or more cylinders and an intake manifold, a compressor coupled upstream of an intake throttle, a charge air cooler coupled downstream of the compressor, an accelerator pedal for receiving an operator torque request, and a controller with computer readable instructions. The instructions may include code for, while an accelerator pedal position is maintained, in response to an amount of condensate stored at the charge air cooler being higher than a threshold, increasing an opening of the intake throttle to increase airflow to the intake manifold while maintaining engine torque; and fueling each engine cylinder based on respective water ingestion sensitivities while maintaining an exhaust air-to-fuel ratio at or around stoichiometry. The fueling may include rich fueling a first cylinder with a higher water ingestion sensitivity and lean fueling a second cylinder with a lower water ingestion sensitivity, a richness of the rich fueling and a leanness of the lean fueling adjusted to maintain the exhaust air-to-fuel ratio at or around stoichiometry. The richer cylinders may be operated at a higher level of spark advance to maintain torque during the ingestion of the condensate, and improve robustness to knock as the rate of condensate decreases as a function of the total condensate stored, and the rate of consumption of the condensate by the engine. Maintaining engine torque may also include, while increasing engine airflow, advancing spark ignition timing, adjusting (e.g., advancing or retarding) a variable camshaft timing and/or adjusting (e.g., increasing) an alternator load. As such. The engine airflow is increased from an initial setting to a blow-off setting, the blow-off setting based on the amount of condensate stored at the charge air cooler.

In another example, an engine method comprises, unequally flowing amounts of condensate from a charge air cooler to among engine cylinders, and compensating for the unequal condensate flow by operating cylinders receiving more condensate rich and cylinders receiving less condensate lean, with an overall exhaust air-fuel ratio maintained at stoichiometry. The method further comprises, increasing engine airflow to direct condensate from the charge air cooler to an engine intake, the increasing engine airflow generating the unequal condensate flow. That is, the increasing airflow purges condensate from the CAC which is distributed unequally along the engine cylinders due to the physical shape of the intake manifold. Increasing engine airflow may include adjusting a degree of leanness of the cylinders operating lean to raise an engine airflow level above a threshold level to flow condensate from the charge air cooler to among the engine cylinders. To increase the engine airflow, an opening of an air intake throttle may be increased based on the degree of leanness. An amount of condensate flowed into each engine cylinder is based on one or more of engine speed, engine geometry, cylinder position on engine block, and cylinder firing order. The controller may operate cylinders receiving more condensate than a threshold amount rich, a degree of richness based on the number of cylinders receiving more condensate than the threshold amount and a number of cylinders receiving less condensate than the threshold amount. The controller may also operate cylinders receiving less condensate than the threshold amount lean, the degree of leanness further based on the number of cylinders receiving more condensate than the threshold amount and the number of cylinders receiving less condensate than the threshold amount.

Figure 4:
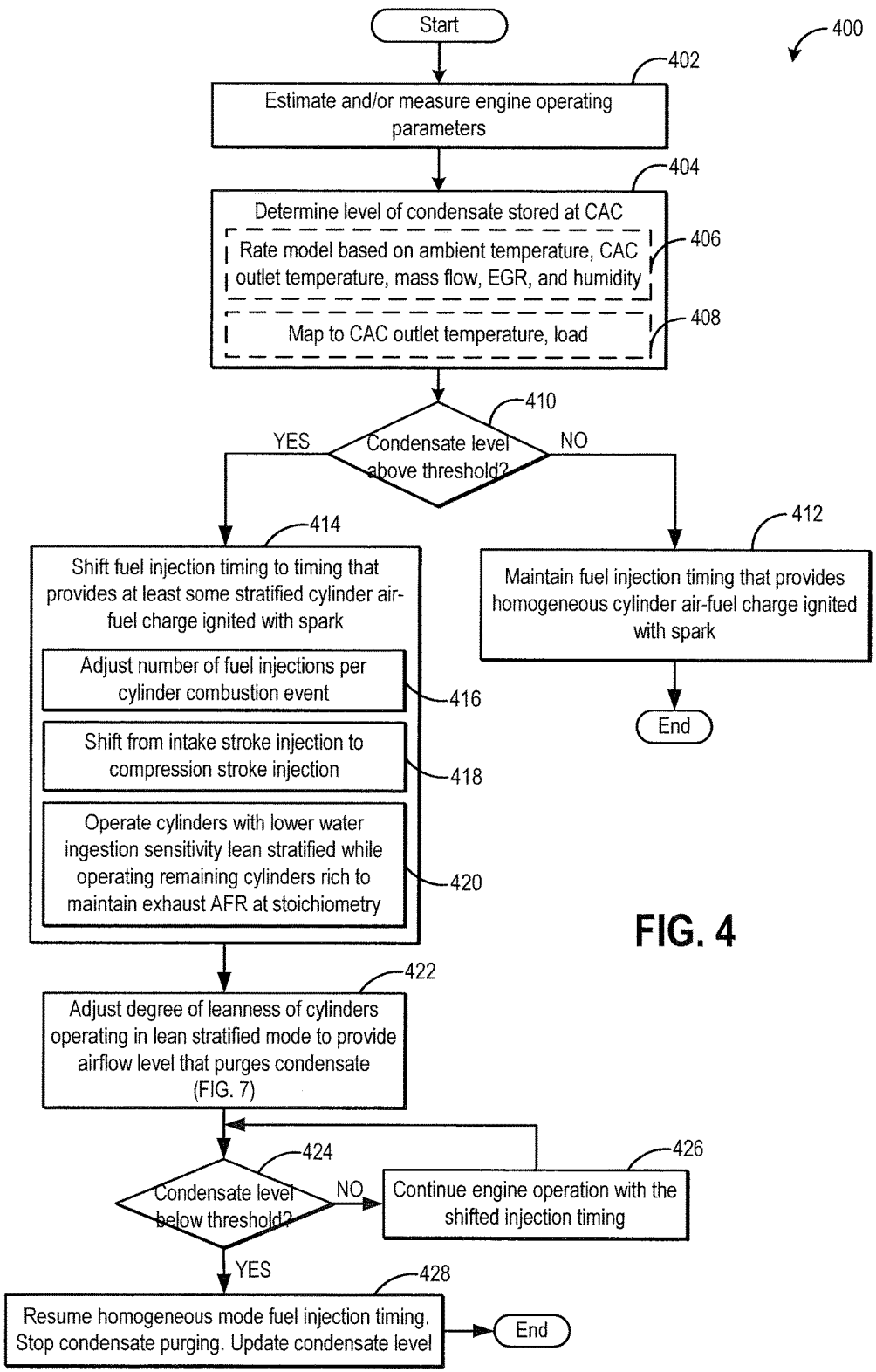
FIG. 4 shows a high level flow chart of a method for adjusting fuel injection during purging of condensate from a charge air cooler (CAC) to temporarily operate one or more engine cylinders in a lean stratified mode.
Figure 5:
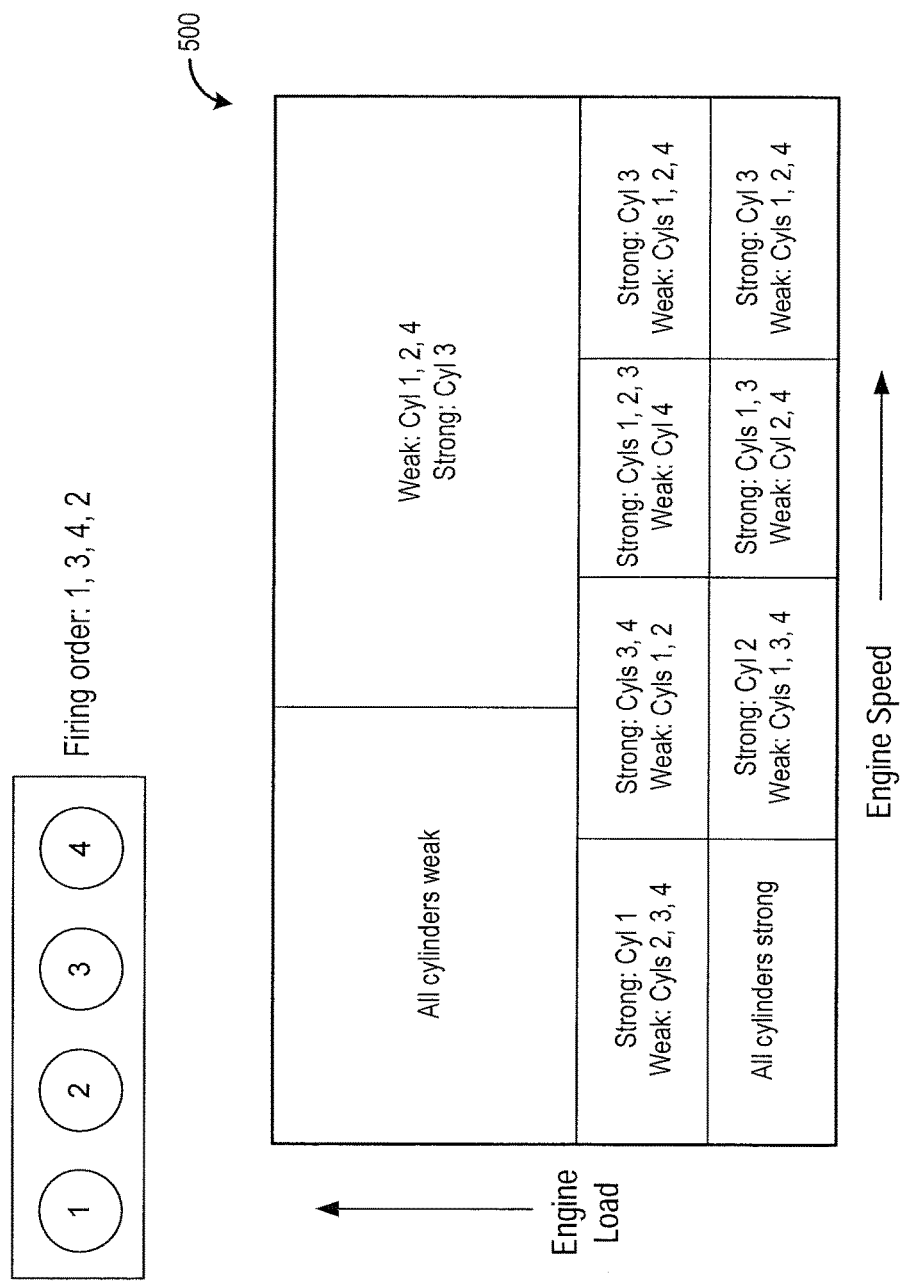
FIG. 5 shows an example look-up table that may be used to store data regarding water ingestion sensitivity of engine cylinders.

Now turning to FIG. 4, an example routine 400 for purging condensate from a CAC while adjusting fuel injection timing of engine cylinders is depicted. The method enables at least some engine cylinders to be operated in a lean stratified mode during condensate purging so that sufficient mass airflow rate is provided for ingesting the condensate. The reason a controller may choose to operate one or more engine cylinders in the lean stratified mode, if available, is that this operation would allow the overall lean operation of the "leaner" or "stronger" cylinders, thus allowing incrementally more airflow and condensate purging. Operating in the lean stratified mode may include operating the whole engine in an overall lean stratified mode, or operating some cylinders in the lean stratified mode while operating other cylinders in a rich mode so that an overall exhaust air-fuel ratio is maintained oscillating around stoichiometry. As such, whole engine operation in the lean stratified mode may only be possible for a short duration, until catalyst efficiency drops. After whole engine operation in the lean stratified mode, a period of rich operation may be required to restore the catalyst efficiency. The total duration of time operated lean stratified would be determined by the oxygen storage capacity of the catalyst. By increasing engine airflow while adjusting the fuel injection timing of the cylinders, condensate can be purged without increasing the frequency of misfires or other combustion issues.

At 402, as at 302, the routine includes estimating and/or measuring engine operating conditions including, but not limited to, driver torque demand (based on a pedal position), engine speed (Ne) and load, ECT, boost, ambient temperature, MAF, MAP, EGR amount, air-fuel ratio (A/F), ambient humidity, ambient pressure, BP, engine temperature, exhaust catalyst temperature, CAC conditions (inlet and outlet temperature, inlet and outlet pressure, flow rate through the CAC, etc.) and other parameters.

At 404, as at 304, the routine includes determining a level (or amount) of condensate stored at the CAC. As discussed at FIG. 3, the condensate level may be estimated based on each of mass air flow, ambient temperature, CAC outlet temperature, CAC pressure, ambient pressure, an EGR amount, and input from a humidity sensor. The condensate levels may be modeled based on, at 406 (as at 306) a model that computes the rate of condensate formation within the CAC based on ambient temperature, CAC outlet temperature, mass flow, EGR, humidity, etc. Alternatively, at 408 (as at 308), condensate levels may be mapped to CAC outlet temperature and a ratio of CAC pressure to ambient pressure, or CAC outlet temperature and engine load.

At 410, the determined condensate level may be compared to a threshold level to determine if purging conditions have been met. The threshold level may be an upper threshold of condensate storage. If the condensate level is not higher than the threshold level, then at 412, it may be determined that purging conditions have not been met and a clean out cycle is not initiated. In addition, fuel injection timing may be maintained at a (first) fuel injection timing that provides homogeneous cylinder air-fuel charge that is ignited with spark.

If the condensate level is higher than the threshold level, then at 414, the routine includes, in response to the condensate level in the charge air cooler, adjusting fuel injection timing while increasing engine airflow to a level greater than requested by a vehicle operator. Specifically, fuel injection timing may be shifted from the first injection timing providing a homogeneous cylinder air-fuel charge ignited with spark to a second injection timing providing at least some stratified cylinder air-fuel charge ignited with spark.

In particular, fuel injection timing may be adjusted so that one or more engine cylinders are operated in a lean stratified mode. As elaborated below, this may include operating some cylinders in the lean stratified mode while operating other cylinders at stoichiometry so that an overall exhaust air-fuel ratio is lean, or operating all cylinders in the lean stratified mode so that an overall exhaust air-fuel ratio is lean. By operating lean at least temporarily, the manifold airflow rate may be increased to or above a blow off level that is sufficient to start the condensate purging but not high enough to cause misfire and poor combustion. In still another example, operating some cylinders in the lean stratified mode may include operating some cylinders lean while operating other cylinders rich so that an overall exhaust air-fuel ratio (received at an exhaust three-way catalyst, for example) is at or around stoichiometry (e.g., oscillates around stoichiometry).

Adjusting the fuel injection timing from the first timing to the second timing may include, for example at 416, adjusting a number of fuel injections per cylinder combustion event. The adjusting may also include, for example at 418, shifting from the first injection timing including an intake stroke injection to the second injection timing including a compression stroke injection. As used herein, the intake stroke injection may include any one of an early intake stroke injection (e.g., one that starts late in the exhaust stroke and ends early in the intake stroke), a mid intake stroke injection (e.g., one that starts and ends in the intake stroke) and a late intake stroke injection (e.g., one that starts in the intake stroke and ends in the compression stroke), and wherein the compression stroke injection includes a late compression stroke injection.

In one example, the controller may transition the fuel injection timing from a single intake stroke fuel injection to a split fuel injection including at least a compression stroke injection. The number of multiple injections may be based on the condensate level. For example, as condensate level exceeds the threshold level, the controller may adjust the fuel injection timing to increase a number of fuel injections per engine cycle, and increase a ratio of fuel delivered in a compression stroke relative to an intake stroke. The split ratio may also be determined by the amount of leanness required. For example, induction injection (intake stroke injection) may be used to schedule an overall lean operation, while compression injection may be used close to spark ignition to maintain a relatively combustible mixture around the spark plug.

Shifting the fuel injection timing may further include adjusting the injection timing of all the cylinders with the timing of "strong" cylinders having a lower water ingestion sensitivity (or those ingesting less condensate) in the lean stratified mode while adjusting the injection timing of the "weak" cylinders having a higher water ingestion sensitivity (or those ingesting more condensate) in a rich mode such that an overall exhaust air-fuel ratio is maintained at or around stoichiometry with at least the rich cylinders operated with additional spark advance. As discussed with reference to FIG. 3, the water ingestion sensitivity of the cylinders may be predetermined during engine testing and stored in a look-up table (such as the table of FIG. 5) in the controller's memory.

In an alternate example, instead of operating cylinders having lower water ingestion sensitivity in the lean stratified mode while operating cylinders having higher water ingestion sensitivity in a rich mode with an overall exhaust air-fuel ratio maintained around stoichiometry, shifting the fuel injection timing may include operating cylinders having lower water ingestion sensitivity in the lean stratified mode while operating cylinders having higher water ingestion sensitivity in a stoichiometric mode with an overall exhaust air-fuel ratio maintained lean. By not operating the weak cylinders lean, the likelihood of condensate ingestion induced misfires in the weak cylinders is reduced.

As such, the lean stratified mode injection timing for the selected cylinders may be adjusted so that a richer air-fuel ratio is provided in the vicinity of the spark plug while providing an overall lean air-fuel ratio in the cylinder. By providing a rich air-fuel ratio around the spark plug, a more stable combustion is enabled. By providing an overall lean cylinder combustion air-fuel ratio, the manifold air flow rate is raised sufficiently high to enable purging of the condensate to be initiated.

At 422, a degree of leanness of the lean stratified operation may be adjusted to increase engine airflow to or above the blow-off level that enables condensate purging. That is, by operating in the lean stratified mode, engine airflow level is increased based on the condensate level in the charge air cooler. The engine airflow level is then increased to a blow-off level required to purge condensate from the charge air cooler. By raising the airflow rate, a condensate airflow stripping velocity in the CAC is raised, which purges the condensate into the engine.

The degree of leanness may be further based on the susceptibility of the cylinders to receive condensate. This is because condensate may not come out evenly from the CAC into the engine cylinders. Specifically, during the purging, more condensate may come out at an initial part of the purging while less condensate may be come out at a later part of the purging. To address this unequal release of condensate, the controller may track the cylinder firing order so that cylinders firing during the initial part of the purging (e.g., immediately after purging is started or earlier in the cylinder firing order), which are more likely to receive more condensate, are adjusted to have a lower degree of leanness while cylinders firing during the later part of the purging (e.g., sometime after purging is started or later in the cylinder firing order), which are more likely to receive less condensate, are adjusted to have a higher degree of leanness.

For example, certain cylinders may be more prone to getting the condensate. By estimating the transport delay time for the condensate to get from the CAC to the "prone" cylinders, and further based on how much condensate has accumulated (e.g., modeled or measured), and how much has been consumed, the controller may estimate the number of affected combustion cycles and the decay rate to adjust accordingly. Alternatively, the controller may use the knock sensor output as feedback to determine when the condensate has purged, and when to return air, fuel and spark control back to normal levels. For example, in response to an increase in knocking frequency in the rich operated cylinders, completion of condensate ingestion may be determined.

A degree of richness of the remaining cylinders is then adjusted based on the degree of leanness so that an overall exhaust air-fuel ratio is maintained around stoichiometry. By providing stoichiometric exhaust to a downstream emission control device, an exhaust catalyst can be kept catalytically active, providing improved emissions performance.

As elaborated below at FIG. 7, the adjusting may include first determining the degree of leanness required to operate the strong cylinders in the lean stratified mode and then adjusting the degree of richness of the weak cylinders to provide an overall stoichiometric exhaust air-fuel ratio (or lean exhaust air-fuel ratio, as required). In other words, the degree of leanness of the weak cylinders may be the limiting factor. This is because operation in the lean stratified mode may require a threshold degree of leanness. Thus, it may be required that the strong cylinders are operated with a degree of leanness that is within the lean stratified mode limit. The degree of leanness may also be determined by the airflow increase needed to strip the condensate and maintain torque output.

At 424, as at 324, the condensate level at the CAC may be reassessed and it may be determined if sufficient purging has occurred. In particular, it may be determined if the condensate level is below a threshold level, specifically, a lower threshold level. The lower threshold level may reflect a lower threshold of condensate storage at the CAC. Further, the lower threshold level may include some margin for hysteresis. If the condensate level is still above the threshold level, at 426, the routine includes continuing engine operation with the injection timing shifted to the second timing that provides lean stratified combustion with spark. In one example, the operating at least some cylinders in the lean stratified mode may be continued for a few seconds to complete the purging.

If the condensate level is determined to be below the (lower) threshold level, then at 428, the routine includes stopping the purging of condensate from the CAC to the engine intake. This includes returning fuel injection timing to the first injection timing and resuming homogeneous combustion of cylinder air-fuel charge with spark.

Figure 7:
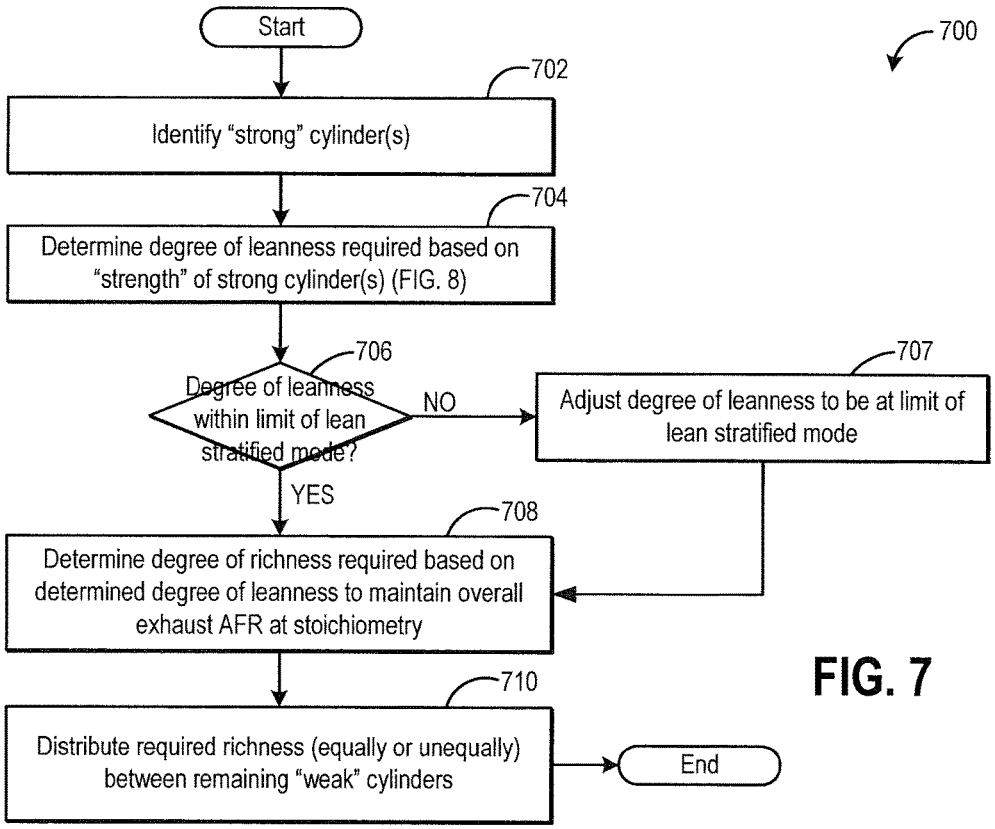
FIG. 7 shows a high level flow chart of a method for determining a degree of leanness of the "strong" cylinders based on a lean stratified mode limit and adjusting the degree of richness for the "weak" cylinders in accordance.
Figure 8:
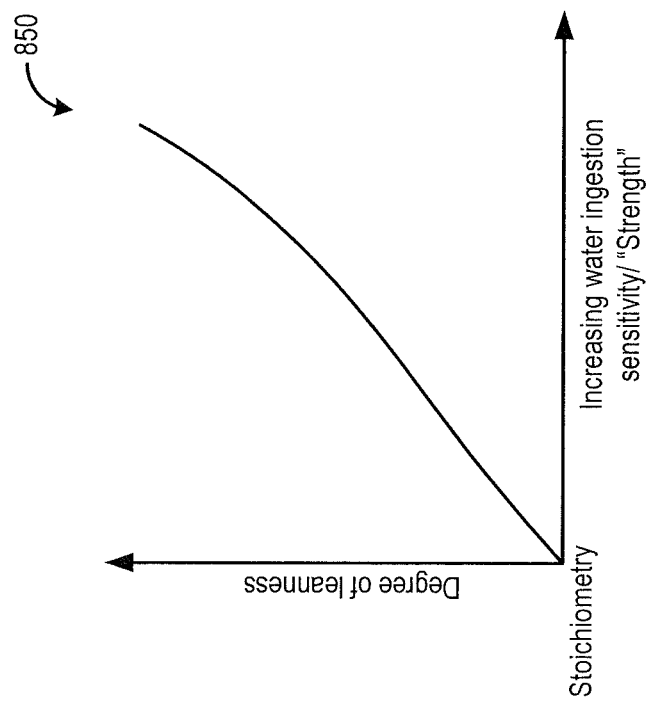
FIG. 8 shows a map depicting a relationship between the strength of the strong cylinders and the degree of leanness required, and a weakness of the weak cylinders and the degree of richness required.
Figure 8:
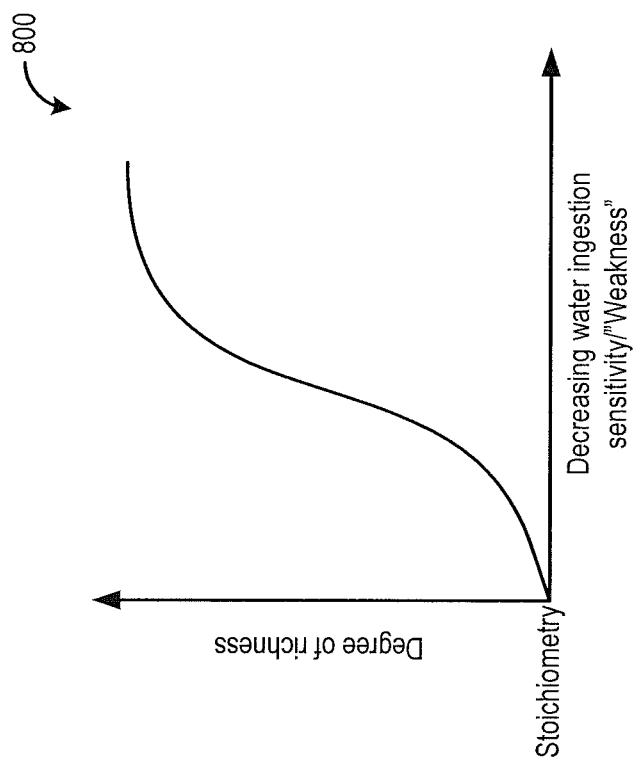

Turning to FIG. 7, routine 700 depicts a method for determining the degree of leanness of the strong cylinders and adjusting the degree of richness of the weak cylinders in accordance. As such, the routine of FIG. 7 may be performed as part of the routine of FIG. 4, specifically at 422.

At 702, the strong cylinders having lower water ingestion sensitivity may be identified. For example, the strong cylinder data may be retrieved from the look-up table disclosed in FIG. 5. At 704, a (minimum) degree of leanness required to operate the strong cylinders in the lean stratified mode may be determined. For example, based on the strength of the cylinder, a degree of leanness of a lean fuel injection may be determined. In one example, the controller may use a map, such as map 850 of FIG. 8 to determine the degree of leanness required for the cylinder based on its "strength", the degree of leanness required increasing as the "strength" of the strong cylinders increases. At 706, the determined degree of leanness is compared to a limit of the lean stratified mode. For example, the determined degree of leanness may be compared to a lower leanness threshold or limit of operation in the lean stratified mode. If the determined degree of leanness is not within the limit (e.g., it is richer than the limit), then at 707, the routine includes readjusting the determined degree of leanness to be at the lean stratified mode limit. After readjusting, or if the determined degree of leanness is already within the lean stratified mode limit, at 708, based on the determined degree of leanness, a degree of richness required to provide a desired exhaust air-fuel ratio (e.g., overall at or around stoichiometry or overall leaner than stoichiometry) is calculated. Then, at 710, the required richness is distributed between the remaining "weak" cylinders having higher water ingestion sensitivity. The required richness may be distributed equally, with each of the weak cylinders receiving fuel with the same degree of richness. Alternatively, the required richness may be distributed unequally with each of the weak cylinders receiving a fuel injection having a richness based on each cylinder's weakness. The controller may used a map, such as map 800 of FIG. 8 to determine the degree of richness required for each weak cylinder based on its respective "weakness", the degree of richness increased as the "weakness" of the weak cylinders increases, and further based on the desired richness to provide the desired overall exhaust air-fuel ratio. Likewise, similar to map 800, the additional spark may be mapped to the weakness of the weak cylinders, and the propensity of the cylinders to receive condensate may be used to estimate the spark advance required to restore combustion to optimal phasing.

For example, the engine may be an in-line 4 cylinder engine having one strong cylinder and 3 weak cylinders at the time of purging. Based on the strength of the strong cylinder, a leanness of 1.3 lambse may be determined. As such, this value may be within a lean stratified mode limit (of 1.5 lambse). Accordingly, to provide an overall stoichiometric exhaust (AFR=1.0), the remaining weak cylinders may either receive an equal richness of 0.9 lambse. Alternatively, the richness may be distributed unequally with a first weak cylinder operating at 0.8 lambse, a second weak cylinder operating at 0.9 lambse, and a third weak operating at 1.0 lambse. In another example, based on the strength of the strong cylinder, a leanness of 16:1 AFR may be determined. As such, this value may be within a lean stratified mode limit (of 17:1 AFR). In another example, depending on the engine combustion chamber design, a lean stratified limit of ~30:1 AFR may be applied because the compression injection near the spark plug is rich enough for combustion while the overall air-fuel ratio remains very lean. Accordingly, to provide an overall stoichiometric exhaust (14:1 AFR), the remaining weak cylinders may either receive an equal richness of 11:1 AFR. Alternatively, the richness may be distributed unequally with a first weak cylinder operating at 10.5:1 AFR, a second weak cylinder operating at 11.0:1 AFR, and a third weak operating at 11.0:1 AFR.

In this way, the routine of FIG. 4 (and FIG. 7) enables condensate purging with reduced combustion issues. By temporarily operating at least the cylinders with lower water ingestion sensitivity in a lean stratified mode, manifold airflow rate can be sufficiently increased to blow off condensate to the cylinders without inducing misfires. By optionally adjusting the fuel injection timing of the cylinders that are most prone to misfire to operate rich, combustion issues in those cylinders during the purging can be reduced. By maintaining an overall exhaust air-fuel ratio around stoichiometry, emissions benefits are achieved.

In one example, a controller may purge condensate from a charge air cooler while temporarily shifting cylinder combustion to a lean stratified mode, a degree of enleanment based on an amount of condensate at the charge air cooler and a cylinder firing order during the purging. Temporarily shifting cylinder combustion to a lean stratified mode may include shifting combustion in (only) a first cylinder having a lower water ingestion sensitivity to the lean stratified mode. Optionally, while shifting combustion in the first cylinder to the lean stratified mode, combustion in a second cylinder having a higher water ingestion sensitivity may be shifted to a rich mode and operated at a more advanced spark placement such that an overall exhaust air-fuel ratio is maintained around stoichiometry, and the spark placement maintains the optimal burn rate. A degree of enleanment may be adjusted to provide an engine airflow that is higher than a threshold level (e.g., blow-off level), the threshold level based on the amount of condensate at the charge air cooler. The degree of enleanment may be further based on a lean stratified mode leanness limit, the degree of enleanment adjusted to be within the limit, the degree of enrichment then adjusted based on the degree of enleanment to provide stoichiometric exhaust. One or more of the degree of enleanment and a duration of operating in the lean stratified mode may be increased as the amount of condensate increases above a threshold amount. Temporarily shifting to the lean stratified mode may also includes shifting from a homogeneous mode where fuel is injected at least in an intake stroke to the lean stratified mode where fuel is injected at least in a compression stroke. Further still, the controller may performing a split fuel injection and increase a number of fuel injections per engine cycle based on the amount of condensate at the charge air cooler.

In another example, an engine system comprises an engine including one or more cylinders, a compressor coupled upstream of an intake throttle, a charge air cooler coupled downstream of the compressor, a direct fuel injector for injecting fuel into an engine cylinder, and a controller with computer readable instructions. The computer may include code for, while an accelerator pedal position is maintained, in response to a condensate level at the charge air cooler being higher than a threshold, adjusting an engine fuel injection timing to operate one or more cylinders in a lean stratified mode until the condensate level is below the threshold. The adjusting may include operating cylinders having lower water ingestion sensitivity in the lean stratified mode while operating cylinders having higher water ingestion sensitivity in a stoichiometric mode with an overall exhaust air-fuel ratio maintained lean for a period of time determined by the catalyst oxygen storage capacity, followed a period of rich operation after the condensate is consumed to return the oxygen storage balance and efficiency in the catalyst. Additionally, the adjusting may include operating cylinders having lower water ingestion sensitivity in the lean stratified mode while operating cylinders having higher water ingestion sensitivity in a rich mode with an overall exhaust air-fuel ratio maintained around stoichiometry.

Figure 9:
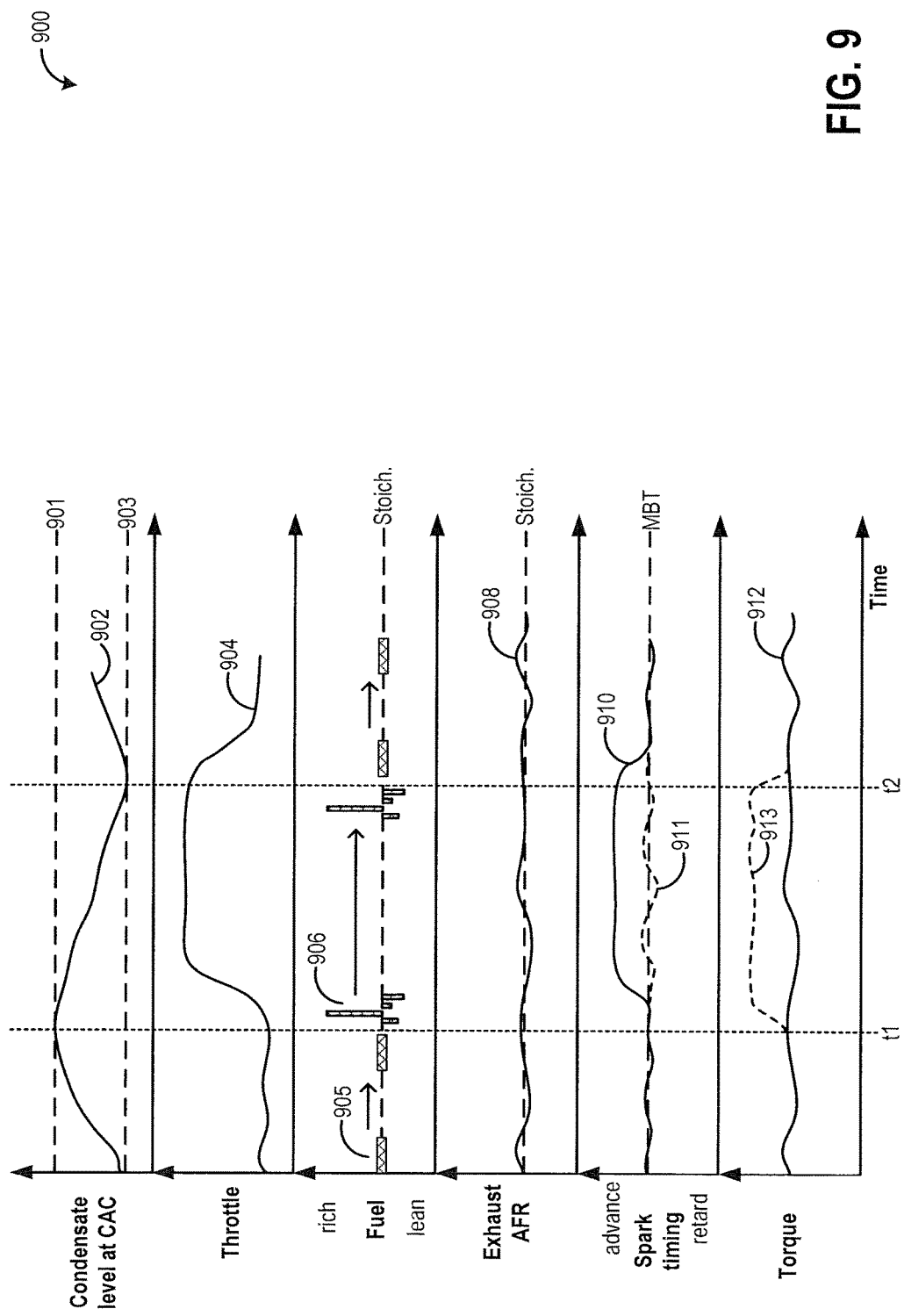
FIG. 9 shows a graphical example of adjusting fuel injection to one or more engine cylinders during purging based on their respective water ingestion sensitivities.

Now turning to FIG. 9, map 900 depicts an example condensate purging operation wherein fuel injection and combustion air-fuel ratios of cylinders are individually adjusted based on respective water ingestion sensitivities. The approach allows condensate purging with reduced occurrence of cylinder misfires. Map 900 depicts condensate levels at the CAC at plot 902, air intake throttle position at plot 904, fuel injection changes at 905-906, an overall exhaust air-fuel ratio (sensed near an exhaust emission control device) at plot 908, spark timing adjustments at plot 910, and engine torque at plot 912.

Prior to t1, condensate may be accumulating during engine operation at the charge air cooler (plot 902). The engine may be operating prior to t1 with fuel injection to each cylinder adjusted to provide stoichiometric cylinder combustion (see block 905 relative to dashed line) and with spark timing at MBT (plot 910). A throttle opening (plot 904) and fuel injection amount may be adjusted to provide an engine airflow that corresponds to a torque output (plot 912) that meets the driver torque demand. Also, prior to t1, the engine may not be knocking.

At t1, condensate levels may reach an upper threshold 901 triggering purging conditions. At t1, in response to the elevated condensate level, cylinder fueling may be adjusted so that one or more engine cylinders are operated leaner than stoichiometry. In the depicted example, three cylinders may be operated lean while one cylinder is operated rich (see blocks 906 relative to dashed line). The controller may maintain fuel injection to the lean cylinders while increasing engine airflow to the cylinders to provide the desired leanness. In particular, the degree of leanness may of the lean operating cylinders may be adjusted so that the engine airflow level is increased to or above a threshold level where condensate can be stripped from the charge air cooler and purged into the engine intake. The throttle opening may be increased to increase engine airflow and provide the requisite degree of leanness. As such, the water ingestion sensitivity of the cylinders may vary. Therefore the controller may advantageously select the strong cylinders having lower water ingestion sensitivity for operating lean (to provide the increased engine airflow) while selecting the remaining weak cylinders having higher water ingestion sensitivity for operating rich (to enable air-fuel ratio control). In addition, since the increased engine airflow may flow condensate from the CAC into the engine, but unequally to the engine cylinders (with some receiving more condensate than others), by adjusting the cylinder fueling based on the inherent variation in cylinder sensitivity to water ingestion, the unequal condensate flow may be compensated for.

Specifically, the weak cylinders (herein one cylinder) having higher water ingestion sensitivity may be operated rich while the remaining strong cylinders (herein three cylinders) having lower water ingestion sensitivity may be operated lean. The degree of leanness of the strong cylinders may be adjusted based on the condensate level at the CAC to increase the engine airflow level above the threshold. The degree of richness of the remaining cylinders is then adjusted based on the degree of leanness of the weak cylinders to maintain an overall exhaust air-fuel ratio (AFR) at stoichiometry (see dashed line). In the depicted example, the degree of leanness of the strong cylinders is adjusted unequally, with each cylinder adjusted based on its strength, the stronger the cylinder, the higher the degree of leanness tolerated (see three hatched blocks below dashed stoichiometric line).

To maintain the engine torque output while fueling the cylinders differently, as well as to reduce the knocking frequency of the weak cylinders ingesting condensate, the cylinder operating rich may also be operated with spark timing advanced from MBT, as shown at plot 910. At the same time, the cylinders operating lean may be operated with nominal spark timing maintained, as shown at dashed plot 911. In alternate examples, the rich cylinders may have more spark advance while the lean cylinders have less spark advance.

As such, engine operation with fueling as per 906 may be continued for a number of engine cycles and the condensate level may start falling from upper threshold 901. At t2, the condensate level may be at or below lower threshold level 903 indicating that the condensate has been sufficiently purged from the CAC. In addition, due to consumption of the condensate in the engine, the rich operating (weak) cylinders may start to knock. Just before t2, the knocking frequency of the rich cylinders may increase, and the output of a knock sensor coupled to the rich cylinders may frequently exceed a knock threshold. In response to the sudden increase in knock frequency, the controller may infer than condensate consumption has been completed. Accordingly, at t2, original settings of engine airflow, fueling and ignition timing may be resumed. Specifically, the throttle opening may be decreased to a nominal position based on engine operating conditions. Also, spark timing may be returned to MBT. Further, engine operation may be resume with fueling as per 905 (stoichiometric cylinder combustion).

It will be appreciated that while the above example actively increases the engine airflow without increasing engine torque responsive to the condensate level to enable purging, in an alternate example, the condensate may be opportunistically purged during a tip-in while taking advantage of the increased engine airflow of the tip-in. For example, in response to a tip-in occurring at t1 (or shortly after t1), the intake throttle opening may be increased (plot 904) to provide the engine airflow required to meet the increased torque demand. In addition, spark timing may be maintained at MBT (see dotted segment 911) so that engine torque can be increased based on driver demand (see dotted segment 913). While the condensate is opportunistically purged, the fuel injection to the cylinders may be shifted to the cylinder-by-cylinder basis (as per 906) so that combustion stability issues of each cylinder can be addressed when ingesting condensate during the purging. At t2, responsive to a tip-out the engine airflow may be decreased.

In this way, condensate can be purged without degrading combustion in engine cylinders and while reducing the frequency of ingestion induced misfires.

Now turning to FIG. 10, map 1000 depicts an example condensate purging operation wherein fuel injection timing and mode of combustion of cylinders are adjusted to provide an engine airflow that enables condensate blow-off without increasing the occurrence of cylinder misfires. Map 1000 depicts an air-fuel ratio of engine cylinders at plot 1002 wherein air-fuel ratios to the right of the y-axis depict increasing degree of richness while air-fuel ratios to the left of the y-axis depict increasing degree of leanness. A leanness range required for cylinder operation in a lean stratified mode is shown at 1004 (shaded block).

In the depicted example, the engine is an in-line four cylinder engine having three weak cylinders (W1-W3) and one strong cylinder (S1). In response to elevated condensate levels, condensate purging may be requested. Therein, to provide the engine airflow required to blow off the condensate, one or more engine cylinders may need to be operated in a lean stratified mode. In the depicted example, the strong cylinder S1 having the lower water ingestion sensitivity may be selected for operation in the lean stratified mode.

Based on the condensate level in the CAC, a degree of leanness for S1 is determined. Herein, the determined degree of leanness may be within lean stratified mode limit 1004, and therefore permissible. Thus, S1 is operated in the lean stratified mode with the determined degree of leanness. At the same time, weak cylinders W1-3 are operated in a rich mode with a degree of richness adjusted based on the leanness of S1 so that an overall exhaust air fuel ratio is maintained at stoichiometry. Herein, the degree of richness of cylinders W1-3 are adjusted based on their "weakness" with the less weak cylinders W1 and W2 being enriched less and the more weak cylinder W3 being enriched more. By operating S1 in the lean stratified mode, the increased engine airflow can be used to purge the condensate while lean operation is used in the cylinder that tolerates the most condensate ingestion to reduce the potential for misfires. At the same time, rich operation is used in the cylinders that do not tolerate condensate ingestion well to improve combustion stability in the cylinders and reduce the potential of misfires in those cylinders.

As such, the degree of richness of the weak cylinders may be adjusted within a range. Specifically, if a weak cylinder is enriched too much, this could result in late combustion that could turn into misfire with the addition of the condensate. Thus, the weak cylinders with the least water ingestion are likely operated richest, with the weakest cylinder getting the most condensate operated the least rich, possible past RBT (rich for best torque) while still maintaining overall stoichiometric air-fuel ratio at the exhaust catalyst.

In an alternate example, the degree of leanness the strong cylinder (herein S1' depicted in dashed lines) may be determined to be outside of lean stratified mode limit 1004. Specifically, the required leanness may be less lean than a minimum amount of leanness required to operate in the lean stratified mode (see S1' outside of shaded block 1004). In such a scenario, the degree of leanness of S1' is adjusted to lie within or at the lean stratified mode limit. For example, as shown by the arrow, the degree of leanness for S1' may be increased more than required so that the leanness falls within the leanness required for operation in the lean stratified mode. To compensate for the added leanness, one or more of the weak engine cylinders may have their degree of richness increased. In the depicted example, as shown by the arrow, the degree of richness of W3 may be increased to compensate for the increase in leanness of S1'.

In another example, in response to condensate level in a charge air cooler, a controller may adjust fuel injection of each engine cylinder based on a water ingestion sensitivity of each cylinder to increase an engine airflow above a threshold level while maintaining an overall exhaust air-fuel ratio around stoichiometry. The adjusting may include, enleaning one or more engine cylinders having lower water ingestion sensitivity, a degree of leanness adjusted to increase the engine airflow above the threshold level, and enriching remaining engine cylinders having higher water ingestion sensitivity, a degree of richness adjusted based on the degree of leanness to maintain the exhaust air-fuel ratio around stoichiometry. The adjusting may be performed in response to condensate level in the charge air cooler being higher than a threshold amount. The threshold (airflow) level above which the engine airflow is increased may be is based on a difference between the condensate level in the charge air cooler and the threshold amount. Thus, as the condensate level at the CAC increases, a degree of leanness of the lean operating cylinders may be increased to according further raise the engine airflow level. The degree of richness of the rich operating cylinders may then be adjusted in accordance to maintain an overall stoichiometric exhaust air-fuel ratio.

In this way, condensate may be periodically cleaned from a charge air cooler by blowing off condensate to the engine cylinders. By adjusting the fueling of each cylinder during the condensate purging and the spark advance to cylinders receiving a majority of the condensate, based on each cylinder's water ingestion sensitivity, and/or the amount of condensate ingested, variations in cylinder combustion stability and misfire occurrence can be compensated for. By operating cylinders that are more prone to condensate induced combustion issues richer than stoichiometry, combustion stability of those cylinders during purging is improved. By operating other cylinders that are less prone to condensate induced combustion issues leaner than stoichiometry, an overall stoichiometric environment can be provided in the exhaust, improving engine performance and exhaust emissions. By adjusting fuel injection timing so that at least one or more strong cylinders are operated in a lean stratified mode, an engine airflow level can be sufficiently increased to initiate condensate purging. By using a stratified injection mode that maintains a rich environment in the vicinity of a cylinder's spark plug, combustion stability is improved. Overall condensate purging is enabled while reducing combustion issues related to condensate ingestion.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine method, comprising:
in response to condensate level in a charge air cooler, adjusting fuel injection timing while increasing engine airflow to a level greater than requested by a vehicle operator.

2. The method of claim 1, wherein adjusting fuel injection timing includes shifting from a first injection timing providing a homogeneous cylinder air-fuel charge ignited with spark to a second injection timing providing at least some stratified cylinder air-fuel charge ignited with spark.

3. The method of claim 2, wherein the first injection timing includes an intake stroke injection and wherein the second injection timing includes a compression stroke injection.

4. The method of claim 3, wherein the intake stroke injection includes one of an early intake stroke injection, a mid intake stroke injection and a late intake stroke injection, and wherein the compression stroke injection includes a late compression stroke injection.

5. The method of claim 4, wherein adjusting fuel injection timing further includes adjusting a number of fuel injections per combustion event.

6. The method of claim 5, wherein adjusting the number of fuel injections includes transitioning from a single intake stroke fuel injection to a split fuel injection including at least a compression stroke injection.

7. The method of claim 1, wherein adjusting fuel injection timing includes, as condensate level exceeds a threshold, increasing a number of fuel injections per engine cycle, and increasing a ratio of fuel delivered in a compression stroke relative to an intake stroke.

8. The method of claim 1, wherein the increased engine airflow level is based on the condensate level in the charge air cooler.

9. The method of claim 1, wherein in response to a condensate level in the charge air cooler includes in response to the condensate level being higher than a threshold level.

10. The method of claim 1, wherein adjusting to increase engine airflow level includes adjusting to increase engine airflow level to a blow-off level required to purge condensate from the charge air cooler.

11. An engine system, comprising:
an engine including one or more cylinders;
a compressor coupled upstream of an intake throttle;
a charge air cooler coupled downstream of the compressor;
a direct fuel injector for injecting fuel into an engine cylinder; and
a controller with computer readable instructions for,
while an accelerator pedal position is maintained, in response to a condensate level at the charge air cooler being higher than a threshold,
adjusting an engine fuel injection timing to operate one or more cylinders in a lean stratified mode until the condensate level is below the threshold.

12. The system of claim 11, wherein the adjusting includes operating cylinders having lower water ingestion sensitivity in the lean stratified mode while operating cylinders having higher water ingestion sensitivity in a stoichiometric mode with an overall exhaust air-fuel ratio maintained lean, or operating cylinders having lower water ingestion sensitivity in the lean stratified mode while operating cylinders having higher water ingestion sensitivity in a rich mode with an overall exhaust air-fuel ratio maintained around stoichiometry.

* * * * *